US010027006B2

(12) United States Patent
Cheng et al.

(10) Patent No.: US 10,027,006 B2
(45) Date of Patent: *Jul. 17, 2018

(54) INTEGRATED MULTI-BAND BANDPASS MULTIPLEXER BASED ON DIELECTRIC RESONATORS

(71) Applicants: ZTE Corporation, Shenzhen (CN); ZTE Canada Inc., Toronto (CA)

(72) Inventors: Dajun Cheng, Kanata (CA); Hongwei Zhang, Shanxi (CN)

(73) Assignees: ZTE Corporation, Shenzhen (CN); ZTE Canada Inc., Ontario (CA)

( * ) Notice: Subject to any disclaimer, the term of this patent is extended or adjusted under 35 U.S.C. 154(b) by 143 days.

This patent is subject to a terminal disclaimer.

(21) Appl. No.: 15/084,338

(22) Filed: Mar. 29, 2016

(65) Prior Publication Data

US 2016/0294031 A1    Oct. 6, 2016

(30) Foreign Application Priority Data

Mar. 30, 2015   (WO) ................ PCT/CN2015/075414

(51) Int. Cl.
| | |
|---|---|
| *H01P 1/20* | (2006.01) |
| *H04L 27/00* | (2006.01) |
| *H04L 5/14* | (2006.01) |
| *H01P 5/16* | (2006.01) |

(52) U.S. Cl.
CPC .............. *H01P 1/2002* (2013.01); *H01P 5/16* (2013.01); *H04L 5/143* (2013.01); *H04L 27/0002* (2013.01)

(58) Field of Classification Search
CPC ................................................... H04B 7/0413
See application file for complete search history.

(56) References Cited

U.S. PATENT DOCUMENTS

| | | |
|---|---|---|
| 2005/0030133 A1 | 2/2005 | Rawnick et al. |
| 2007/0024399 A1 | 2/2007 | Antolin et al. |
| 2011/0037529 A1 | 2/2011 | Kishimoto |
| 2012/0184231 A1 | 7/2012 | Cheng et al. |
| 2014/0104136 A1 | 4/2014 | Werner et al. |
| 2016/0126622 A1 | 5/2016 | Cheng et al. |
| 2017/0295007 A1 | 10/2017 | Cheng |

*Primary Examiner* — Graham Smith
(74) *Attorney, Agent, or Firm* — Perkins Coie LLP

(57) ABSTRACT

Various embodiments of an integrated multiband bandpass apparatus based on concentric dielectric ring resonators includes one or more radio frequency (RF) input transmission lines for receiving multi-band RF signals, multiple RF output transmission lines for receiving and transmitting multiple single-band RF signals, and a set of dielectric ring resonators coupled in between. The disclosed integrated multi-band bandpass apparatus based on dielectric ring resonators can support at least two operation modes, i.e., a multi-band bandpass filtering mode when used in one direction and a multi-band bandpass multiplexing mode when used in an opposite direction. When operating in the multi-band bandpass filtering mode, the multiple dielectric ring resonators can be used to simultaneously filter multi-band RF signals into multiple single-band bandpass signals. When operating in the multi-band bandpass multiplexing mode, the dielectric ring resonators can be used to multiplex multiple single-band bandpass signals into a multi-band RF signal.

52 Claims, 17 Drawing Sheets

Integrated RF Multi-band Bandpass Filter/Multiplexer Circuit 400

Integrated RF Multi-band Bandpass Filter/Multiplexer Circuit 700

Integrated RF Multi-band Bandpass Filter/Multiplexer Circuit 800

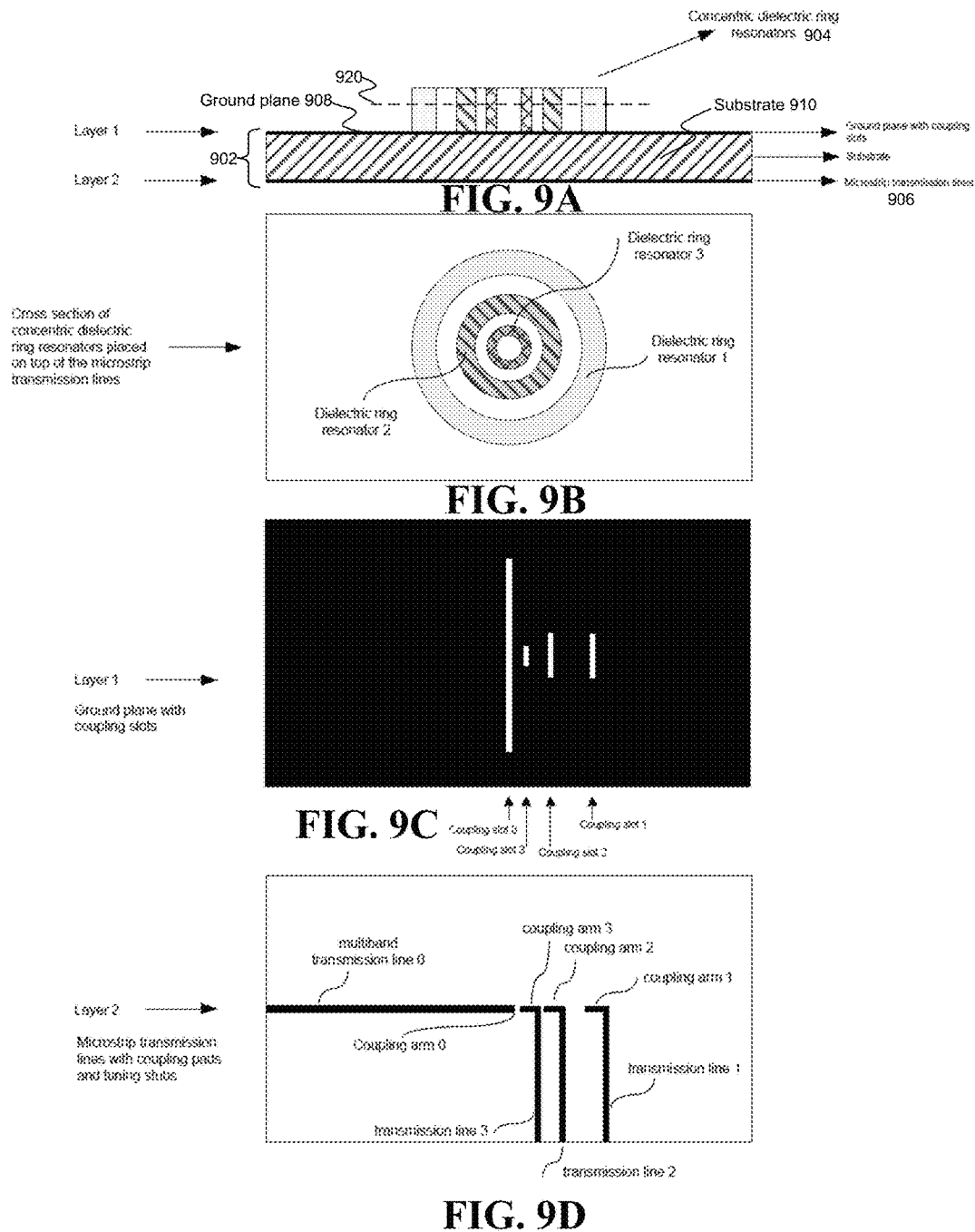

INTEGRATED MULTI-BAND BANDPASS MULTIPLEXER BASED ON DIELECTRIC RESONATORS

CROSS REFERENCE TO RELATED APPLICATIONS

This patent document claims the benefit of priority under 35 U.S.C. § 119(a) and the Paris Convention of International Patent Application No. PCT/CN2015/075414, filed on Mar. 30, 2015. The entire contents of the before-mentioned patent application is incorporated by reference herein.

TECHNICAL FIELD

This patent document generally relates to radio frequency (RF) communications. More specifically, embodiments of this patent document relate to systems, devices and techniques for processing multiband RF signals for RF communication applications.

BACKGROUND

Signals at different radio frequency bands, or "multiband signals" or "multi-band signals," are frequently used in various wireless communication applications, such as portable wireless communication devices. Examples of multi-band RF communication technologies include but not limited to CDMA bands BC0/1/16, GSM bands 2/3/5/8, WCDMA bands 1/2/4/5/6/8, TD-SCDMA bands 34/39, FDD LTE bands 1/2/3/4/5/7/8/12/13/17/20/25/26, TDD LTE bands 38/39/40/41, GPS, Wi-Fi bands at 2.4 GHz and 5 GHz, and others.

Various commonly used multiband multi-radio system designs are based on a combination of multiple single-band bandpass filters, duplexers, and switches for handling multiband radio operations, such as out-of-band noise and interference, spurious emission, and antenna isolation. Such single-band bandpass filters and duplexers are discrete components and are typically used to separately filter their corresponding RF signals at different RF carrier frequencies when a given filter or duplexer is selected by a switch. For example, to feed the RF signals into a multiband antenna, a single-pole multiple-throw (or "SPxT") switch is typically employed to multiplex the RF signals into a signal feeding port of the multiband antenna. However, using a SPxT switch would not allow the device to simultaneously operate under multiple RF communication protocols.

SUMMARY

The technology disclosed in this patent document provides, among others, systems, devices and techniques for using dielectric resonators at different resonance frequencies to filter different signals at different frequencies within a multi-band signal, such as multi-band radio frequency (RF) communication signals. In the examples provided in this document, such dielectric resonators are integrated with other RF components and structures to form an integrated multi-band bandpass multiplexer device. This integrated multi-band bandpass multiplexer device can include multiple input transmission lines and multiple output transmission lines and a plurality of dielectric resonators coupled between the multiple input transmission lines and the multiple output transmission lines. In some embodiments, the disclosed integrated multi-band bandpass multiplexer device includes a single input transmission line and multiple output transmission lines. In other embodiments, the disclosed integrated multi-band bandpass multiplexer device includes multiple input transmission lines and a single output transmission line. The disclosed integrated multi-band bandpass multiplexer device can function as a multiplexer in some applications, and as a demultiplexer in other applications. The disclosed integrated multi-band bandpass multiplexer device can function as multiple bandpass filters in some other applications.

This integrated multi-band bandpass multiplexer device can be configured as multi-band bandpass filters when operating in one direction of the device, and a multi-band bandpass multiplexer when operating in another direction of the device, and can be configured in a compact size suitable for mobile phones or other compact communication or electronic devices of multi-band operations. For each individual frequency band, the corresponding dielectric resonator within the integrated multi-band bandpass multiplexer device can be a single dielectric resonator or a combination of electromagnetically coupled dielectric resonators that have similar resonator frequencies to collectively provide the desired signal filtering at the particular frequency band.

Different from existing RF filters used in mobile phones, tablets and other RF communication devices, each dielectric resonator in a multi-band bandpass multiplexer based on the disclosed technology is all dielectric without a conductive element and can be configured to achieve a high quality factor at a corresponding RF band. To some extent, the filtering operation by the dielectric resonators in the disclosed technology resembles a photonic dielectric resonator in the optical domain.

Specific examples of the disclosed integrated multi-band bandpass multiplexer are disclosed by using dielectric ring resonators, such as concentric dielectric ring resonators to replace multiple spatially-separated RF bandpass filters, duplexers, and switches distributed in multiple frequency bands. Using the disclosed integrated multi-band bandpass multiplexer, multiple desired passbands corresponding to the multiple resonant frequencies of the multiple ring resonators can be simultaneously filtered in processing multi-band RF signals, such as multi-band RF signals comprising multiple RF communication protocols (e.g., a combination of code division multiple access (CDMA), global system for mobile (GSM), Wideban CDMA (WCDMA), Time Division Synchronous CDMA (TD-SCDMA), frequency-division-duplex long-term-evolution (FDD LTE), time-division-duplex (TDD LTE), global positioning system (GPS), and WiFi protocols). By constructing the integrated multi-band bandpass multiplexer using concentric ring configurations, the print circuit board (PCB) real estate requirement for multiple bandpass filters/multiplexers operating at multiple frequency bands is significantly reduced. Various configurations of the integrated multi-band bandpass multiplexer based on the concentric dielectric ring resonators provide flexibility in the layout design and manufacturing of multiband radios for mobile devices, such as compact smartphones, mobile phones, portable tablet computers, portable laptop computers, GPS devices, WiFi devices, etc. These configurations of the concentric dielectric ring resonators can include but are not limited: a slot-coupling configuration, a direct-coupling configuration, and an embedded direct-coupling configuration.

Various embodiments of the integrated multiband bandpass multiplexer based on concentric ring resonators can significantly attenuate unwanted signals (e.g., noise signals) without introducing additional insertion loss for the useful signals. These improvements can be attributed to eliminating the SPxT switches and spatially-separated bandpass filters that are typically employed in multiband radio designs, and replacing the SPxT switches and the spatially-separated bandpass filters with a single integrated multi-band bandpass multiplexer circuit. Moreover, by using dielectric materials with high relative permittivity to implement the concentric ring resonators, some embodiments of disclosed technology can achieve very high quality factor (Q) value in the disclosed integrated multiband bandpass multiplexer circuits, thereby providing high rejection to the out-of-band spurious emission and interference. Furthermore, because the resonant frequencies of the disclosed ring resonators are shape-dependent and are nonlinear functions of the dimensions in the cases of circular or elliptical geometries, the harmonics of a desired passband signal can be greatly rejected.

The disclosed integrated multi-band bandpass multiplexer circuits based on dielectric ring resonators can support multiple operation modes including, a multi-band bandpass filtering operation mode when such a circuit is used in one direction and a multi-band bandpass multiplexing operation mode when used in an opposite direction. When operating in the multi-band bandpass filtering operation mode, the multiple dielectric ring resonators can be used to simultaneously filter multi-band RF signals into multiple single-band bandpass signals. Furthermore, when used in the multi-band bandpass filtering operation mode, the disclosed integrated multi-band bandpass multiplexer can be configured as a demultiplexer to select a single bandpass signal. When operating in the multi-band bandpass multiplexing operation mode, the dielectric ring resonators can be used to multiplex multiple single-band bandpass signals into a multi-band RF signal.

In one aspect, an integrated RF multi-band bandpass multiplexer is disclosed. This multi-band bandpass multiplexer includes a first RF transmission line structure for transmitting and receiving multi-band RF signals. The multi-band bandpass multiplexer also includes a plurality of RF transmission line structures for transmitting and receiving multiple single-band RF signals. The multi-band bandpass multiplexer further includes a plurality of dielectric ring resonators of different sizes and different resonant frequencies electromagnetically coupled between the first RF transmission line structure and the plurality of RF transmission line structures. Each of the plurality of dielectric ring resonators operates as a single-band bandpass filter for generating a passband signal having a central frequency corresponding to the associated resonant frequency of the ring resonator.

In some aspects, the first RF transmission line structure includes: a first signal trace within a first conductive layer for transmitting and receiving the multi-band RF signals; a second conductive layer configured as a ground plane; and a dielectric substrate positioned between the first conductive layer and the second conductive layer.

In some aspects, the plurality of RF transmission line structures includes: a plurality of signal traces within the first conductive layer for transmitting and receiving the multiple single-band RF signals; the second conductive layer configured as a ground plane; and the dielectric substrate positioned between the first conductive layer and the second conductive layer.

In some aspects, the plurality of dielectric ring resonators are coplanar, and concentrically positioned with substantially the same axis.

In some aspects, the interspatial gaps between the plurality of dielectric ring resonators are filled with a low dielectric constant material.

In some aspects, the plurality of dielectric ring resonators are embedded in an outer frame filled with a low dielectric constant material.

In some aspects, the plurality of dielectric ring resonators are positioned on top of the first conductive layer to be further away from the second conductive layer.

In some aspects, the plurality of dielectric ring resonators are electromagnetically coupled to the first signal trace through direct contact.

In some aspects, the multi-band bandpass multiplexer also includes a coupling structure between the first signal trace and each of the plurality of dielectric ring resonators. The coupling structure for each of the plurality of dielectric ring resonators further includes: a conductive coupling pad disposed along and in contact with the first signal trace in the first conductive layer and a conductive probe perpendicular to and in electrical contact with the conductive coupling pad. The conductive probe is embedded in the corresponding dielectric ring resonator for electromagnetically coupling the multi-band RF signals from the first signal trace into the dielectric ring resonator through the conductive coupling pad.

In some aspects, the first signal trace includes a tuning stub at an end of the first signal trace which is used for impedance matching between the first signal trace and the set of conductive coupling pads and the set of conductive probes.

In some aspects, the plurality of dielectric ring resonators are positioned on top of the plurality of signal traces in the first conductive layer.

In some aspects, the plurality of dielectric ring resonators are electromagnetically coupled to the plurality of signal traces through direct contact.

In some aspects, the multi-band bandpass multiplexer also includes a coupling structure between each of the plurality of dielectric ring resonators and a corresponding signal trace in the plurality of signal traces of the plurality of RF transmission line structures. The coupling structure further includes: a conductive coupling pad disposed along and in contact with the corresponding signal trace and a conductive probe perpendicular to and in contact with the conductive coupling pad. The conductive probe is embedded in the corresponding dielectric ring resonator for electromagnetically coupling a single-band RF signal between the corresponding signal trace in the plurality of signal traces and the corresponding dielectric ring resonator through the conductive coupling pad.

In some aspects, each of the plurality of signal traces includes a tuning stub at an end of the signal trace which is used for impedance matching between the signal trace and corresponding conductive coupling pad and the conductive probe.

In some aspects, the multi-band bandpass multiplexer further includes a coupling structure between the first signal trace and the plurality of dielectric ring resonators. This coupling structure includes a conductive coupling pad in contact with the first signal trace in the first conductive layer. The conductive coupling pad is configured with a dimension physically overlapping the plurality of dielectric ring resonators for electromagnetically coupling the multi-band RF signals from the first signal trace into each of the plurality of dielectric ring resonators.

In some aspects, the plurality of dielectric ring resonators are embedded in the dielectric substrate between the first conductive layer and the second conductive layer and electromagnetically coupled to the first signal trace through direct contact.

In some aspects, the multi-band bandpass multiplexer further includes a coupling structure between the first signal trace and the plurality of dielectric ring resonators, wherein the coupling structure includes a conductive coupling pad in contact with the first signal trace in the first conductive layer, and wherein the conductive coupling pad is configured with a dimension to be shared by the plurality of dielectric ring resonators for electromagnetically coupling the multi-band RF signals from the first signal trace into each of the plurality of dielectric ring resonators.

In some aspects, the multi-band bandpass multiplexer further includes a coupling structure between each of the plurality of dielectric ring resonators and a corresponding signal trace in the plurality of signal traces of the plurality of RF transmission line structures. The coupling structure includes a conductive coupling pad in contact with the corresponding signal trace in the first conductive layer and electromagnetically coupling a single-band RF signal between the corresponding signal trace in the plurality of signal traces and the corresponding dielectric ring resonator through the conductive coupling pad.

In some aspects, the ground plane of the second conductive layer includes a first coupling slot positioned to at least partially overlap the first signal trace and a plurality of coupling slots positioned so that each of the plurality of coupling slots at least partially overlaps with a corresponding signal trace in the plurality of signal traces.

In some aspects, the plurality of dielectric ring resonators are positioned on top of the second conductive layer away from the first conductive layer, and each of the plurality of dielectric ring resonators is electromagnetically coupled to the first signal trace through the first coupling slot for transmitting and receiving the multi-band RF signals. Each of the plurality of dielectric ring resonators is electromagnetically coupled to a corresponding signal trace in the plurality of signal traces through a corresponding coupling slot in the plurality of coupling slots for transmitting and receiving a single-band RF signals.

In some aspects, the first coupling slot and the plurality of coupling slots are etched into the second conductive layer.

In some aspects, the plurality of dielectric ring resonators are made of high quality factor (Q) dielectric materials associated with a high relative permittivity so that out-of-band spurious emission and harmonic emission and interference are significantly attenuated in each of the generated passband signals.

In some aspects, the plurality of dielectric ring resonators of different sizes and different resonant frequencies include two or more subgroups of ring resonators. Each subgroup of ring resonators includes two or more ring resonators of closely-spaced resonant frequencies. The two or more ring resonators operate as a single wideband bandpass filter having a bandwidth substantially equal to a combined bandwidth of the two or more ring resonators.

In another aspect, a multi-band radio RF communication device is disclosed. This multi-band RF communication device includes a multiband antenna for transmitting and receiving multi-band RF signals. This multi-band RF communication device also includes an integrated RF multi-band bandpass multiplexer that further includes: a first RF transmission line structure coupled to the multiband antenna for transmitting and receiving the multi-band RF signals; a plurality of RF transmission line structures for transmitting and receiving multiple single-band RF signals; and a plurality of dielectric ring resonators of different sizes and different resonant frequencies electromagnetically coupled between the first RF transmission line structure and the plurality of RF transmission line structures for generating the multiple single-band RF signals. Each of the plurality of dielectric ring resonators operates as a single-band bandpass filter for generating a passband signal having a central frequency corresponding to the associated resonant frequency of the ring resonator. This multi-band RF communication device additionally includes: a plurality of multi-band RF transceivers coupled to the plurality of RF transmission line structures for transmitting and receiving the multiple single-band RF signals; and a processor coupled to the plurality of multi-band RF transceiver circuits for processing the multiple single-band RF signals.

In some aspects, each of the plurality of multi-band RF transceivers transmits and receives an RF signal corresponding to a passband signal associated with one of the plurality of dielectric ring resonators.

In some aspects, the integrated RF multi-band bandpass multiplexer operates to simultaneously filter the received multi-band RF signals into the multiple single-band bandpass signals corresponding to the multiple resonant frequencies of the plurality of dielectric ring resonators.

In some aspects, the integrated RF multi-band bandpass multiplexer operates to simultaneously output the multiple single-band bandpass signals to the plurality of multi-band RF transceivers.

In some aspects, the received multi-band RF signals include a combination of the following RF bands: CDMA bands, GSM bands, WCDMA bands, TD-SCDMA bands, FDD LTE bands, TDD LTE bands, GPS bands, and WiFi bands.

In some aspects, each of the plurality of dielectric ring resonators operates to simultaneously receive each of the multi-band RF signals.

In some aspects, the processor operates to periodically command the plurality of multi-band RF transceivers to scan available frequency bands and report signal quality values of the available frequency bands to the processor.

In some aspects, the processor operates to determine a best available frequency band based on the received signal quality values of the available frequency bands and command the plurality of multi-band RF transceivers to seamlessly handover an ongoing communication service from an active frequency band to the best available band without interruption.

In some aspects, the signal quality values include a signal-to-noise ratio (SNR) and a received signal strength indication (RSSI).

In some aspects, the integrated RF multi-band bandpass multiplexer and the plurality of multi-band RF transceivers operate to simultaneously transmit and receive at two or more frequency bands in a multiband multiple-input-multiple-output (MIMO) radio communication.

In some aspects, the two or more frequency bands include: CDMA bands, GSM bands, WCDMA bands, TD-SCDMA bands, FDD LTE bands, TDD LTE bands, GPS bands, and Wi-Fi bands.

In some aspects, the integrated RF multi-band bandpass multiplexer and the plurality of multi-band RF transceivers operate to simultaneously transmit and receive at two or more frequency bands in an inter-band uplink and downlink carrier aggregation operation.

In some aspects, the multi-band RF communication device includes a compact smartphone, a mobile phone, a portable tablet computer, a portable laptop computer, a GPS devices, or a Wi-Fi device.

In a further aspect, a technique for processing a multiband RF signal in a multiband RF communication device is described. This technique includes: receiving multi-band RF signals at a multi-band antenna; coupling the multi-band RF signals to an RF input transmission line; and then simultaneously coupling the multi-band RF signals from the RF input transmission line to each of a plurality of dielectric ring resonators of different sizes and different resonant frequencies. The plurality of dielectric ring resonators then filter the multi-band RF signals into multiple single-band bandpass signals, and simultaneously output the multiple single-band bandpass signals to a plurality of RF output transmission lines by electromagnetically coupling each of the multiple single-band bandpass signals to a corresponding transmission line in the plurality of RF output transmission lines. The multiple single-band bandpass signals are coupled to a plurality of downstream multi-band RF circuits.

In some aspects, the RF input transmission line includes a plurality of input coupling pads and each of the plurality of dielectric ring resonators includes an input feeding probe embedded within the dielectric ring resonator. The technique also includes coupling the multi-band RF signals from the RF input transmission line to each of a plurality of dielectric ring resonators by electromagnetically coupling a portion of the multi-band RF signals onto the input feeding probe corresponding to the dielectric ring resonator through the plurality of input coupling pads.

In some aspects, to electromagnetically couple a portion of the multi-band RF signals onto the input feeding probe through the plurality of input coupling pads, the technique uses electromagnetically coupling between a single coupling pad in direct contact with the RF input transmission line and each input feeding probe of the plurality of dielectric ring resonators.

In some aspects, to electromagnetically couple a portion of the multi-band RF signals onto the input feeding probe through the plurality of input coupling pads, the technique uses electromagnetically coupling between a corresponding input coupling pad within the plurality of input coupling pads in direct contact with the RF input transmission line and the corresponding input feeding probe.

In some aspects, each of the plurality of RF output transmission lines includes an output coupling pad and each of the plurality of dielectric ring resonators includes an output feeding probe embedded within the dielectric ring resonator. Hence, to electromagnetically couple each of the multiple single-band bandpass signals to a corresponding transmission line in the plurality of RF output transmission lines, the technique electromagnetically couples a corresponding single-band bandpass signal between a corresponding output feeding probe and a corresponding output coupling pad.

In yet another aspect, a technique for processing a multiband RF signal in a multiband RF communication device is described. This technique includes: receiving multiple desired RF signals from a set of RF circuits at a plurality of input RF transmission lines; coupling the multiple desired RF signals from the plurality of input RF transmission lines into a set of dielectric ring resonators of different sizes and different resonant frequencies, each of the input RF transmission lines is coupled to a respective dielectric ring resonator within the set of dielectric ring resonators; filtering, at the set of dielectric ring resonators, the multiple desired RF signals into multiple desired bandpass signals based on the resonant frequencies of the set of dielectric ring resonators; simultaneously coupling the multiple desired bandpass signals into an output RF transmission line to multiplex the multiple bandpass signals into a multi-band RF signal; and coupling the multiplexed multi-band RF signal from the output RF transmission line onto a multiband antenna for transmission.

In some aspects, the set of RF circuits includes one or more TDD front-end modules and radio transceivers, one or more FDD front-end modules and radio transceivers, and Wi-Fi modules.

In yet another aspect, a technique for processing a multiband RF signal is described. This technique includes: transmitting and receiving the multiband RF signal in a multiband transmission line, which is electromagnetically coupled to a shared coupling slot etched in a ground conductive plane; electromagnetically coupling the multiband RF signal into a plurality of dielectric ring resonators of different sizes and different resonant frequencies through the shared coupling slot, wherein the plurality of dielectric ring resonators are in direct contact with the ground conductive plane; filtering, at the plurality of dielectric ring resonators to generate a plurality of single-band RF signals; transmitting and receiving the plurality of single-band RF signals in a plurality of single-band transmission lines, wherein each of the single-band transmission lines is electromagnetically coupled to a respective coupling slot etched in the ground conductive plane; and electromagnetically coupling the plurality of single-band RF signals from each of the dielectric ring resonators into the plurality of single-band transmission lines through a respective coupling slot.

These and other aspects and their implementations are described in greater detail in the drawings, the description and the claims.

BRIEF DESCRIPTION OF DRAWINGS

FIG. 9A illustrates a cross-sectional view of exemplary multi-band bandpass multiplexer circuit using a slot coupling mechanism between the ring resonators and the transmission lines.

FIG. 9B illustrates a cross-sectional view of the co-planar waveguide transmission line structure.

FIG. 9C illustrates a top view of the ground plane (layer 1) having a plurality of coupling slots.

FIG. 9D illustrates a cross-sectional view of the conductive layer 2 including the signal traces of input multiband transmission line and multiple output transmission lines.

DETAILED DESCRIPTION

Figure 1:
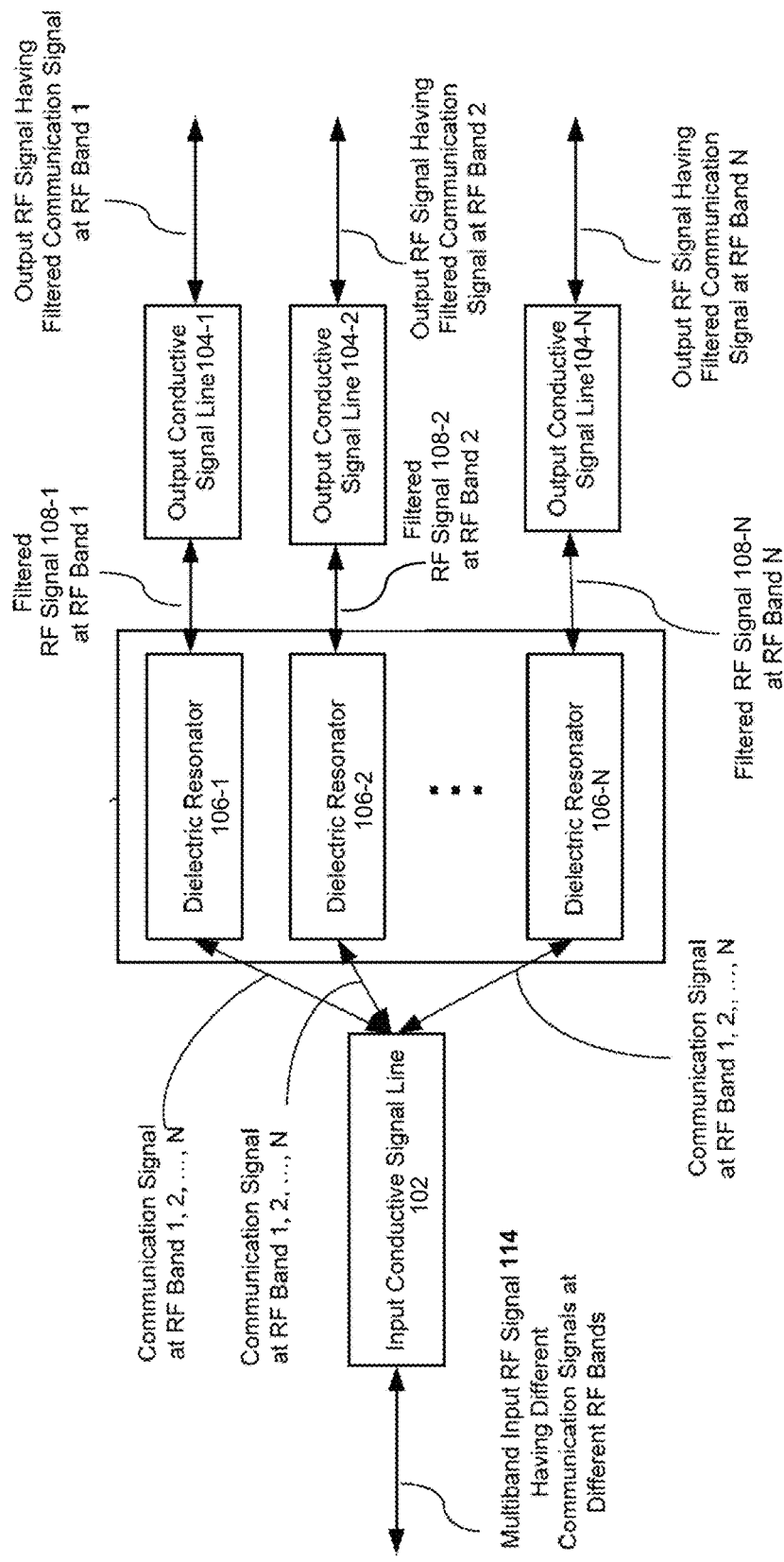
FIG. 1 shows an example of an integrated RF multiband bandpass multiplexer circuit having a set of dielectric resonators configured with different resonant frequencies at the centers of a set of desired frequency bands.

Various commonly used multi-band multi-radio system designs are based on a combination of multiple single-band bandpass filters, duplexers, and switches for handling multiband radio operations, such as out-of-band noise and interference, spurious emission, and antenna isolation. Such single-band bandpass filters and duplexers are discrete components and are typically used to separately filter their corresponding RF signals at different RF carrier frequencies when a given filter or duplexer is selected by a switch. For example, to feed the RF signals into a multiband antenna, a single-pole multiple-throw (or "SPxT") switch is typically employed to multiplex the RF signals into a signal feeding port of the multiband antenna. However, using SPxT switches would not allow the device to simultaneous operate under the multiple RF communication protocols.

To meet various user experiences and usage requirements, the multi-mode multiband wireless communication devices need to be designed to support simultaneous multi-mode multi-band operations. To support simultaneous operation of multi-mode multiband wireless communication, two or more single-pole multiple-throw (SPxT) switches are typically employed, and more than one antenna may have to be used. One such example is a mobile device that supports both multiband cellular radio communications (e.g., FDD LTE bands 1/3/7, TDD LTE bands 38/39/40/41) and Wi-Fi wireless connectivity capability. Moreover, to support simultaneous communication of cellular signals and Wi-Fi service, two antennas are typically required: one for the Wi-Fi service, and the other for cellular service. Furthermore, in LTE carrier aggregation, two or more switches are typically used to support downlink or uplink inter-band for two or more carrier aggregation. However, the needs for multiple switches and multiple antennas within a single mobile device to support simultaneous multi-radio operation significantly increase the burden on real-estate constraints in antenna and printed circuit board (PCB) designs.

Dielectric ring resonators can be designed to operate at various electromagnetic spectrum frequencies, e.g., at RF or microwave frequencies for filtering signals at RF or microwave frequencies. Various embodiments of the disclosed technology integrate dielectric resonators into an RF multiplexer to achieve multiband bandpass characteristics with high quality factor at the desired RF frequency bands.

Throughout this patent document, the terms "integrated multi-band bandpass multiplexer," "integrated multi-band bandpass multiplexer device" and "integrated multi-band bandpass multiplexer circuit," and other apparent variations on these terms are used interchangeably to mean a multi-band bandpass apparatus that includes one or more input transmission lines, one or more output transmission lines, and a plurality of dielectric resonators coupled between the one or more input transmission lines and the one or more output transmission lines. In some embodiments, the disclosed multi-band bandpass apparatus includes a single input transmission line and multiple output transmission lines. In other embodiments, the disclosed multi-band bandpass apparatus includes multiple input transmission lines and a single output transmission line. The disclosed multi-band bandpass apparatus can function as a multiplexer in some applications, as multiple bandpass filters in some applications, and can also function as a demultiplexer in some applications. Hence, the disclosed integrated multi-band bandpass multiplexer is not limited to functioning as a multiplexer.

In one aspect, an integrated RF multi-band bandpass multiplexer is disclosed. This multi-band bandpass multiplexer includes a first RF transmission line structure for transmitting and receiving multi-band RF signals. The multi-band bandpass multiplexer also includes a plurality of RF transmission line structures for transmitting and receiving multiple single-band RF signals. The multi-band bandpass multiplexer further includes a plurality of dielectric ring resonators of different sizes and different resonant frequencies electromagnetically coupled between the first RF transmission line structure and the plurality of RF transmission line structures. Each of the plurality of dielectric ring resonators operates as a single-band bandpass filter for generating a passband signal having a central frequency corresponding to the associated resonant frequency of the ring resonator.

In another aspect, a multi-band radio RF communication device is disclosed. This multi-band RF communication device includes a multiband antenna for transmitting and receiving multi-band RF signals. This multi-band RF communication device also includes an integrated RF multi-band bandpass multiplexer that further includes: a first RF transmission line structure coupled to the multiband antenna for transmitting and receiving the multi-band RF signals; a plurality of RF transmission line structures for transmitting and receiving multiple single-band RF signals; and a plurality of dielectric ring resonators of different sizes and different resonant frequencies electromagnetically coupled between the first RF transmission line structure and the plurality of RF transmission line structures for generating the multiple single-band RF signals. Each of the plurality of dielectric ring resonators operates as a single-band bandpass filter for generating a passband signal having a central frequency corresponding to the associated resonant frequency of the ring resonator. This multi-band RF communication device additionally includes: a plurality of multi-band RF transceivers coupled to the plurality of RF transmission line structures for transmitting and receiving the multiple single-band RF signals; and a processor coupled to the plurality of multi-band RF transceiver circuits for processing the multiple single-band RF signals.

In a further aspect, a technique for processing a multiband RF signal in a multi-band RF communication device is described. This technique includes: receiving multi-band RF signals at a multi-band antenna; coupling the multi-band RF signals to an RF input transmission line; and then simultaneously coupling the multi-band RF signals from the RF input transmission line to each of a plurality of dielectric ring resonators of different sizes and different resonant frequencies. The plurality of dielectric ring resonators then filter the multi-band RF signals into multiple single-band bandpass signals, and simultaneously output the multiple single-band bandpass signals to a plurality of RF output transmission lines by electromagnetically coupling each of the multiple single-band bandpass signals to a corresponding transmission line in the plurality of RF output transmission lines. The multiple single-band bandpass signals are coupled to a plurality of downstream multi-band RF circuits.

In yet another aspect, a technique for processing a multiband RF signal in a multiband RF communication device is described. This technique includes: receiving multiple desired RF signals from a set of RF circuits at a plurality of input RF transmission lines; coupling the multiple desired RF signals from the plurality of input RF transmission lines into a set of dielectric ring resonators of different sizes and different resonant frequencies, each of the input RF transmission lines is coupled to a respective dielectric ring resonator within the set of dielectric ring resonators; filtering, at the set of dielectric ring resonators, the multiple desired RF signals into multiple desired bandpass signals based on the resonant frequencies of the set of dielectric ring resonators; simultaneously coupling the multiple desired bandpass signals into an output RF transmission line to multiplex the multiple bandpass signals into a multi-band RF signal; and coupling the multiplexed multi-band RF signal from the output RF transmission line onto a multiband antenna for transmission.

In yet another aspect, a technique for processing a multiband RF signal is described. This technique includes: transmitting and receiving the multiband RF signal in a multiband transmission line, which is electromagnetically coupled to a shared coupling slot etched in a ground conductive plane; electromagnetically coupling the multiband RF signal into a plurality of dielectric ring resonators of different sizes and different resonant frequencies through the shared coupling slot, wherein the plurality of dielectric ring resonators are in direct contact with the ground conductive plane; filtering, at the plurality of dielectric ring resonators to generate a plurality of single-band RF signals; transmitting and receiving the plurality of single-band RF signals in a plurality of single-band transmission lines, wherein each of the single-band transmission lines is electromagnetically coupled to a respective coupling slot etched in the ground conductive plane; and electromagnetically coupling the plurality of single-band RF signals from each of the dielectric ring resonators into the plurality of single-band transmission lines through a respective coupling slot. In this document, the term "exemplary" is used to mean "an example of" and does not necessarily mean "most suitable," "preferred," "most desirable" and the like.

FIG. 1 shows an example of an integrated RF multiband bandpass multiplexer circuit 100 having a set of dielectric resonators configured with different resonant frequencies at the centers of a set of desired frequency bands. This multi-band bandpass multiplexer circuit 100 includes an input conductive signal line 102 that carries a multiband input RF signal 114 including different communication signals at different RF frequency bands (e.g., Band 1, Band 2, . . . Band N). This multiband bandpass multiplexer circuit 100 also includes a plurality of output conductive signal lines 104 that carry the filtered single-band RF signals at different RF frequency bands (e.g., Band 1, Band 2, . . . Band N), respectively, and distribute the filtered single-band RF signals to multiple downstream RF circuits for use or further processing.

It should be understood that the terms "Band 1," "Band 2," "Band N," etc. throughout this patent document are used solely for the purpose of identifying and distinguishing between different RF frequency bands in the various examples, and are not intended to be used to refer to particular operating frequency bands.

This multiband bandpass multiplexer circuit 100 also includes a set of dielectric resonators 106 coupled between the input conductive signal line 102 and the output conductive signal lines 104. More specifically, the set of dielectric resonators 106 is electromagnetically coupled to the input conductive signal line 102 such that the energy in the different RF frequency bands in the input RF signal 114 is simultaneously coupled into the set of dielectric resonators 106 and thus separated via this coupling. As illustrated in FIG. 1, a portion of input RF signal 114 at RF Bands 1, 2, . . . N is simultaneously coupled into each of the dielectric resonator 106-1, dielectric resonator 106-2, and so on. Once coupled into a corresponding dielectric resonator, the RF signal bounces back and forth or circulates within the corresponding dielectric resonator 106 and is filtered by the corresponding dielectric resonator. The set of dielectric resonators 106 outputs filtered RF signals 108 at different RF frequency bands (e.g., Band 1, Band 2, . . . , Band N), wherein each of the filtered signals in each of the dielectric resonators is centered at the resonance frequency of the corresponding dielectric resonator and has a spectral bandwidth that is predetermined by the resonator quality factor (Q) of the dielectric resonator.

As shown in FIG. 1, the set of output conductive signal lines 104 is electromagnetically coupled to the outputs of the set of dielectric resonators 106. Hence, the filtered signals from the dielectric resonators 106 are coupled to the output conductive signal lines 104 as the output signals of the multi-band bandpass multiplexer circuit 100. More specifically, each output conductive signal line 104 is coupled to the output of each of the set of dielectric resonators 106 to receive a corresponding filtered RF passband signal among the filtered passband RF signals 108. For example, output conductive signal line 104-1 is coupled to the output of dielectric resonator 106-1 to receive filtered RF signal 108-1, output conductive signal line 104-2 is coupled to the output of dielectric resonator 106-2 to receive filtered RF signal 108-2, and so on. In some embodiments, each of the input and output conductive signal lines includes metal or electrically conductive material. Furthermore, each of the input and output conductive signal lines may be an RF waveguide or RF stripline.

In the description above, the multi-band bandpass multiplexer circuit 100 is used in the multiple-band bandpass filtering operation mode. In some other applications, the multi-band bandpass multiplexer circuit 100 in FIG. 1 can be used as a two-way signal transmission and filtering device where the input/output conductive lines 102 and 104 can be used for both receiving and outputting RF signals. For example, in a wireless transceiver device, the multi-band bandpass multiplexer circuit 100 can be used in a filtering operation mode such that the input line 102 is used to receive a downlink multiband signal from a base station and simultaneously output the filtered signals to the output lines 104, wherein each of the output lines 104 transmits a single-band filtered signal. On the other hand, the same multi-band bandpass multiplexer circuit 100 can be used in a reverse direction in a multiplexing operation mode such that the output lines 104 are used to receive multiple uplink signals to be sent to a base station, wherein the input line 102 in FIG. 1 is used to simultaneously output the multiplexed/filtered multiple bandpass uplink signals of desired frequency bands to an antenna of the wireless device for transmission.

In the specific examples disclosed below, the disclosed integrated multiband bandpass multiplexer can use compact ring resonators, such as concentric dielectric ring resonators to replace both single-pole multiple-throw (SPxT) switches and multiple spatially-separated RF bandpass filters distributed in multiple frequency bands, while still achieve simultaneous multiband operation. In the integrated multiband bandpass multiplexer circuit, multiple desired passbands corresponding to the multiple resonant frequencies of the multiple ring resonators can be simultaneously generated from by filtering the input multiband RF signals. By constructing the integrated multiband bandpass multiplexer based on concentric ring configurations, the PCB real estate requirement associated with the use of SPxT switches and multiple single-band discrete bandpass filters operating at multiple frequency bands can be significantly reduced. Various configurations of the integrated multiband bandpass multiplexer based on the concentric ring resonators are disclosed to provide flexibility in the layout design and manufacturing of multiband radios for mobile devices, such as compact smartphones, mobile phones, portable tablet computers, portable laptop computers, GPS devices, WiFi devices, etc. These configurations of the concentric ring resonators can include but are not limited: probe-coupling configuration, direct-coupling configuration, and embedded direct-coupling configuration.

Various embodiments of the integrated multiband bandpass multiplexer based on concentric ring resonators can significantly attenuate unwanted signals (e.g., noise signals) without introducing additional insertion loss for the useful signals. These improvements can be attributed to eliminating the SPxT switches and spatially-separated bandpass filters that are typically employed in multiband radio designs. Moreover, by using dielectric materials with high relative permittivity to implement the concentric ring resonators, some embodiments of disclosed technology can achieve very high Q value in the disclosed integrated multiband bandpass multiplexer, thereby providing high rejection to the out-of-band spurious emission and interference. Furthermore, because the resonant frequencies of the disclosed ring resonators are shape-dependent and are non-linear functions of the dimensions in the cases of circular or elliptical geometries, the harmonics of a desired passband signal can be greatly rejected.

In various examples provided in this disclosure, each dielectric resonator can be designed to have a high Q value to enable sharp roll off for use in densely spaced frequency bands. For each individual frequency band, the corresponding dielectric resonator can be a single dielectric resonator or a combination of electromagnetically coupled dielectric resonators that have similar resonator frequencies to collectively provide the desired operating bandwidth for signal filtering at the particular frequency band. Furthermore, the dielectric resonators shown in FIG. 1 can be configured in a compact size suitable for mobile phones or other compact communication or electronic devices of multiband simultaneous operations.

Figure 2A:
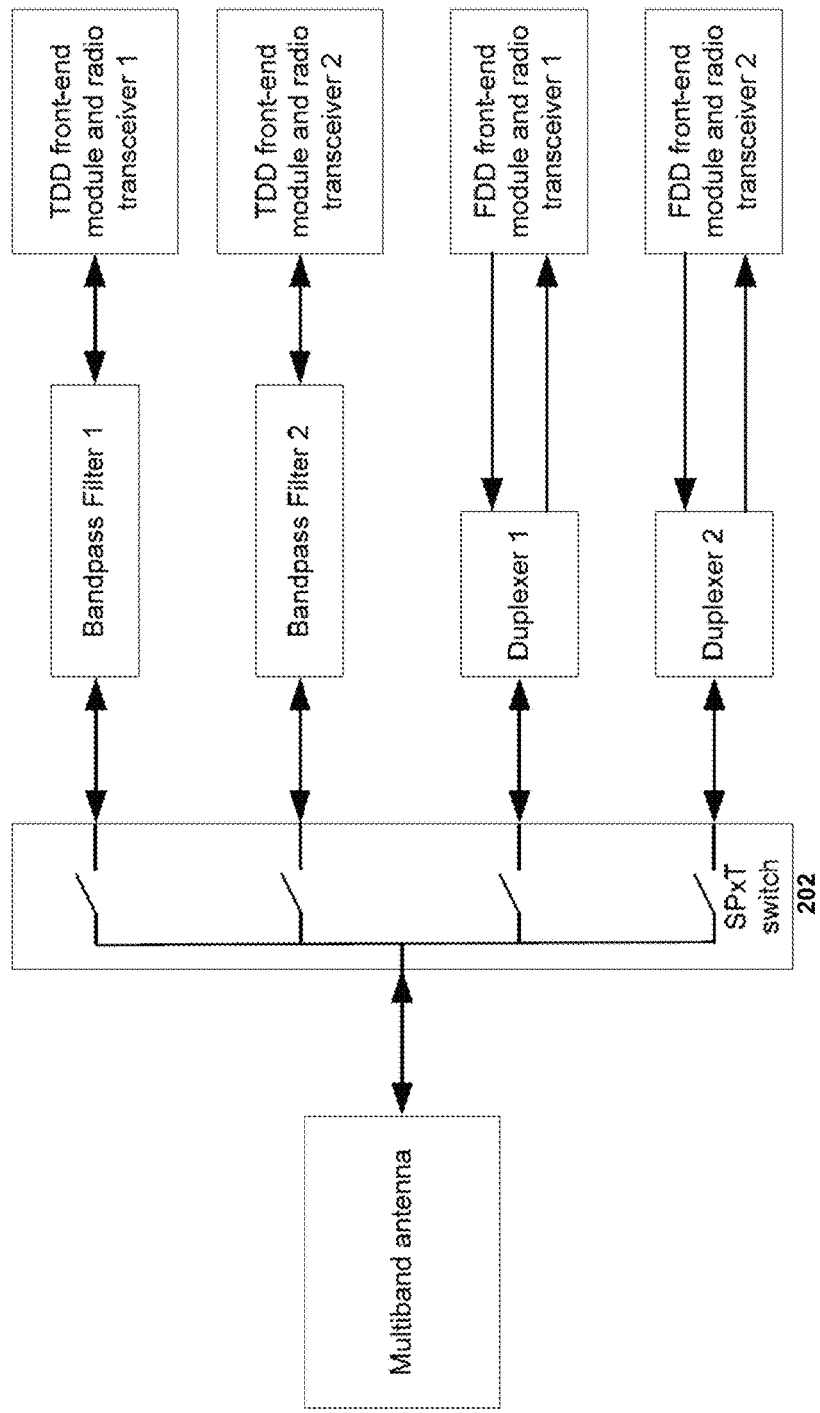
FIG. 2A illustrates a block diagram of a multiband radio communication system including a SPxT switch and a plurality of spatially-separated single-band bandpass filters and duplexers.

FIG. 2A illustrates a block diagram of a multiband radio communication system 200 including a SPxT switch 202 and a plurality of spatially-separated single-band bandpass filters and duplexers. Typically, each bandpass filter 1 or 2 in system 200 is used for a specific band operation of a time division duplex (TDD) communication protocol, and each duplexer 1 or 2 in system 200 is used for a specific band operation of a frequency division duplex (FDD) communication protocol. However, using SPxT switch 202 in system 200 would prevent system 200 to simultaneously operate in multiple frequency bands.

Figure 2B:
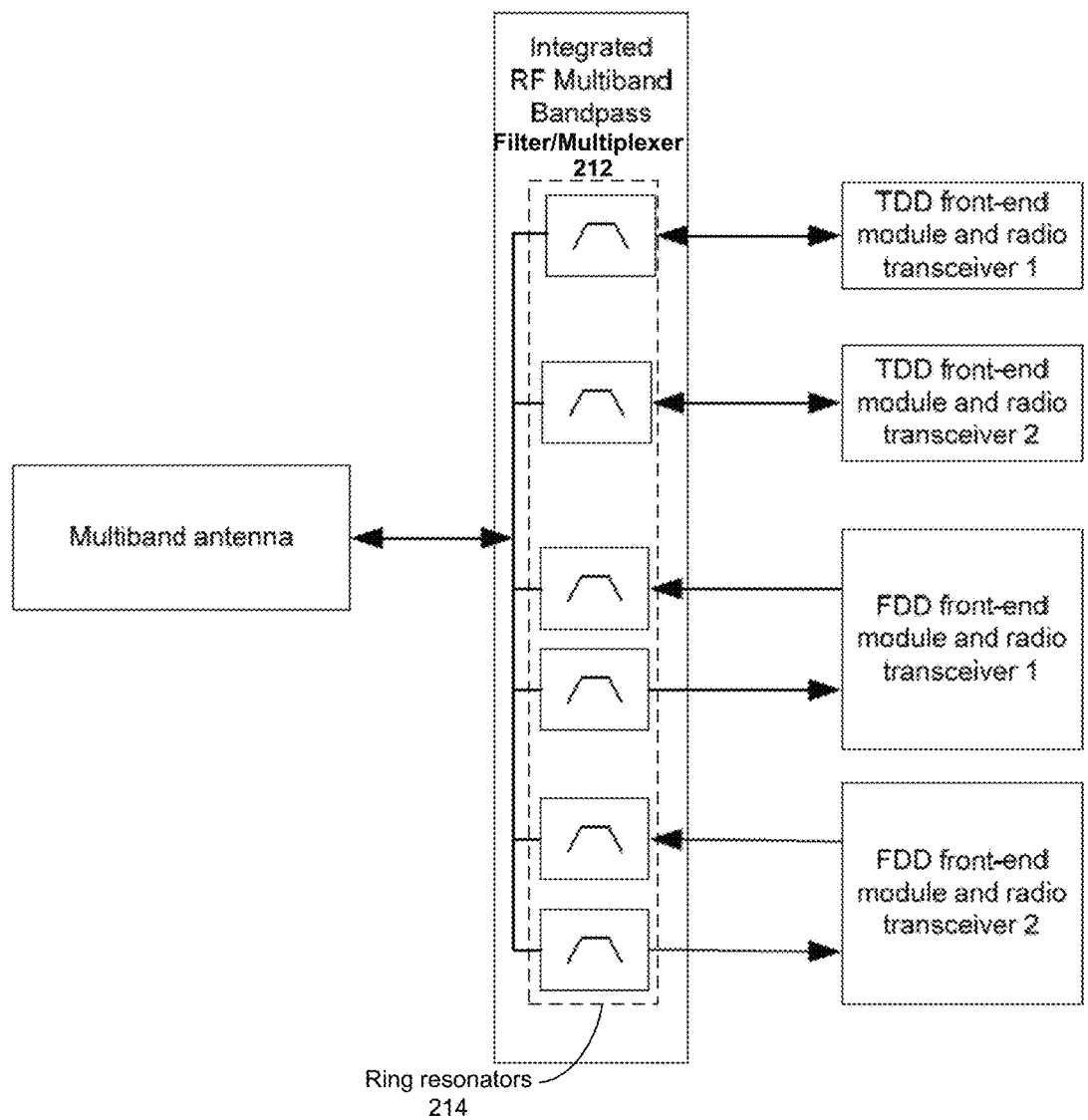
FIG. 2B illustrates a block diagram of exemplary multiband radio communication system using an integrated multiband bandpass multiplexer described in FIG. 1.

Various embodiments of the disclosed technology provide an integrated multiband bandpass multiplexer device based on a plurality of concentric dielectric ring resonators. FIG. 2B illustrates a block diagram an exemplary multiband radio communication system 210 using an integrated multiband bandpass multiplexer 212 described in FIG. 1. As can be seen in FIG. 2B, the integrated RF multiband bandpass multiplexer 212 uses a plurality of dielectric ring resonators 214 to replace both the SPxT switch 202 and the plurality of spatially-separated single-band bandpass filters and duplexers in system 200. The compact design of the plurality of dielectric ring resonators significantly reduces the real estate requirement of the RF components in system 210. Moreover, due to the high Q characteristics of the dielectric material used in the dielectric ring resonators 214, the outputs of the integrated multiband bandpass multiplexer 210 include filtered signals of desired frequency bands with steep out-of-resonance roll off characteristics. Furthermore, removing the switches allows all signal channels in system 210 to simultaneous operate as filters or multiplexers at the desired frequency bands of the plurality of dielectric ring resonators 214 during multi-mode multiband wireless communication.

Figure 3A:
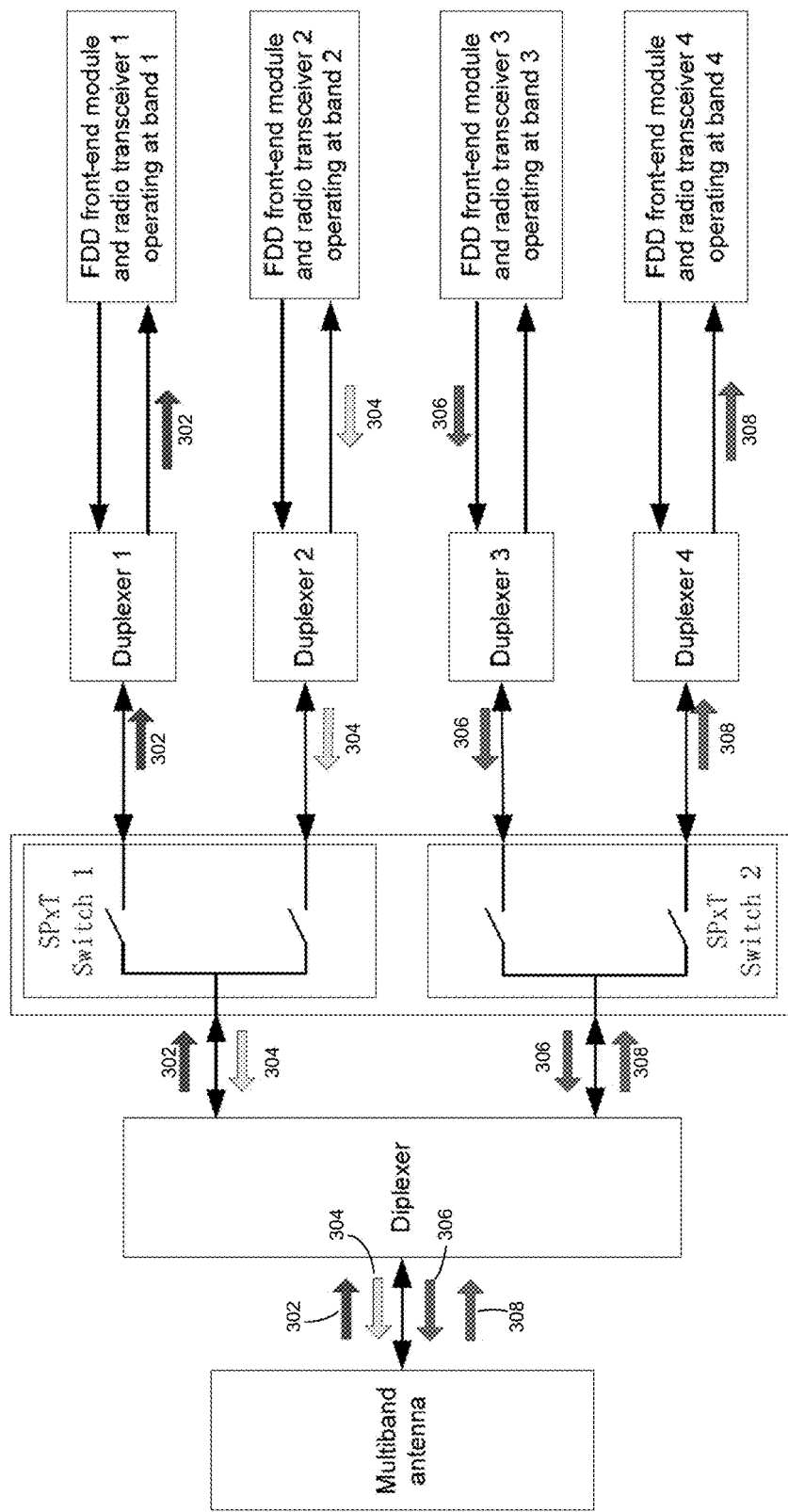
FIG. 3A illustrates a block diagram of exemplary multiband radio communication system configured for 2-channel inter-band carrier aggregation.

FIG. 3A illustrates a block diagram of an exemplary multiband radio communication system 300 configured for 2-channel inter-band carrier aggregation. More specifically, system 300 includes two SPxT switches 1 and 2 and a plurality of spatially-separated single-band bandpass duplexers 1-4. In the inter-band carrier aggregation FDD operation, two or more RF signals simultaneously operating at different frequency bands are combined in the RF system to increase the user data rate. Specifically, in FIG. 3A, the 302 and 308 arrows represent 2-channel signal flows of downlink inter-band carrier aggregation; while the 304 and 306 arrows represent 2-channel signal flows of uplink inter-band carrier aggregation.

Figure 3B:
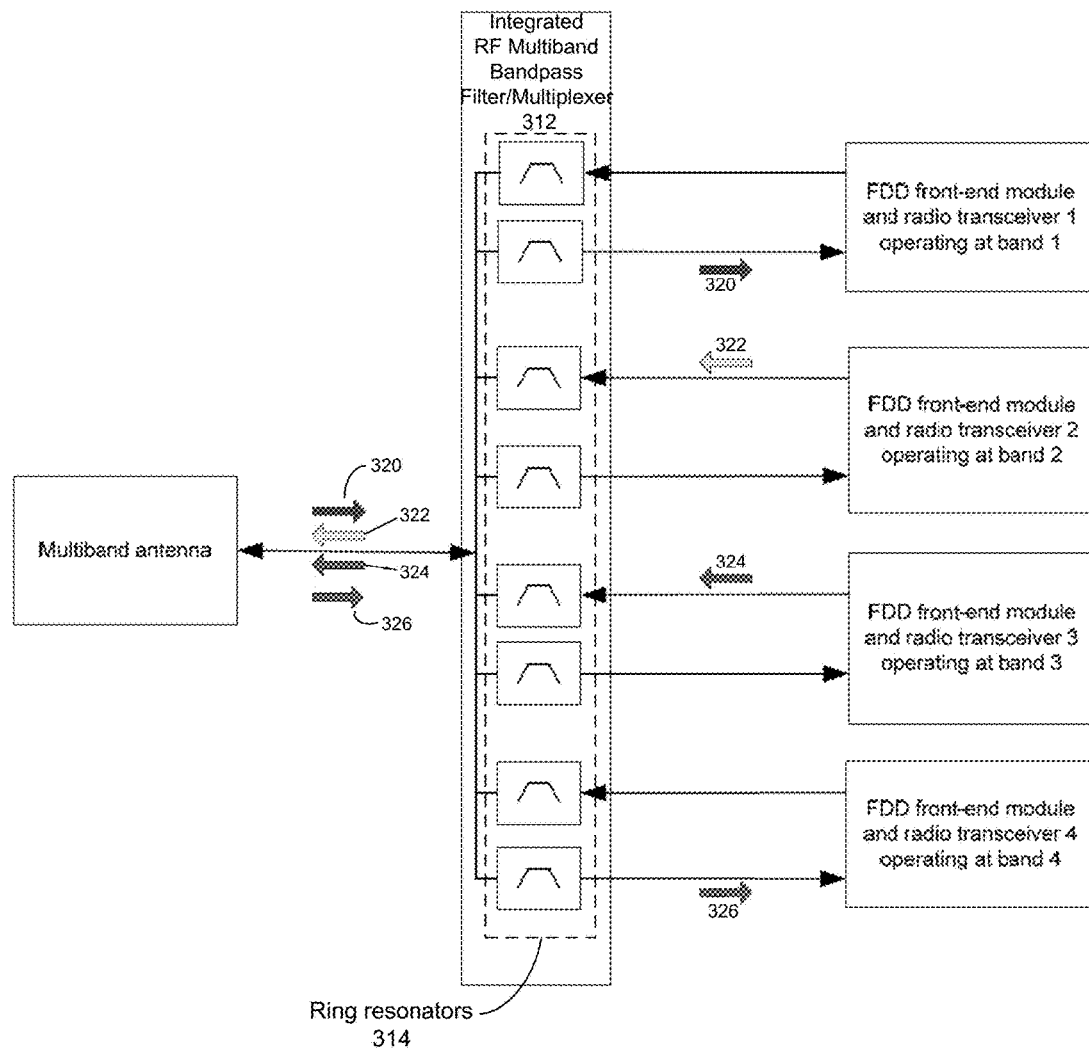
FIG. 3B illustrates a block diagram of exemplary multiband radio communication system configured for 2-channel inter-band carrier aggregation FDD operation using an integrated multiband bandpass multiplexer based on the dielectric ring resonators as described in FIG. 1.

FIG. 3B illustrates a block diagram of an exemplary multiband radio communication system 310 configured for 2-channel inter-band carrier aggregation FDD operation using an integrated multiband bandpass multiplexer 312 based on the dielectric ring resonators as described in FIG. 1. Again, in FIG. 3B, the 320 and 326 arrows represent 2-channel signal flows of downlink inter-band carrier aggregation; while the 322 and 324 arrows represent 2-channel signal flows of uplink inter-band carrier aggregation. As can be seen in FIG. 3B, the integrated RF multiband bandpass multiplexer 312 uses a plurality of dielectric ring resonators 314 to replace both the SPxT switches 1-2 and the plurality of spatially-separated single-band duplexers 1-4 in system 300. The compact design of the plurality of dielectric ring resonators significantly reduces the real estate requirement of the RF components in system 310, allowing system 310 to be significantly smaller in size than system 300.

Figure 4A:
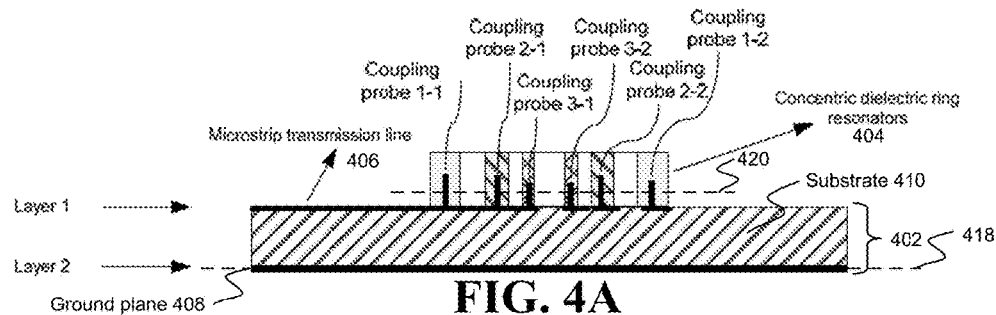
FIG. 4A illustrates a cross-sectional view of exemplary multi-band bandpass multiplexer circuit using probe coupling mechanism to couple RF signals.

FIGS. 4A, 4B, 4C and 4D show an exemplary embodiment of an integrated RF multiband bandpass multiplexer circuit 400 based on concentric dielectric ring resonators and using probe coupling mechanism to couple the RF signals. More specifically, FIG. 4A illustrates a cross-sectional view of the exemplary multi-band bandpass multiplexer circuit 400 using probe coupling mechanism to couple RF signals. The multi-band bandpass multiplexer circuit 400 includes a multiband transmission line structure 402 for transmitting multiband RF signals. Multiband transmission line structure 402 acts as or corresponds to the input and output conductive lines in FIG. 1. Transmission line structure 402 further includes a first conductive layer 1 configured as a microstrip transmission line 406, a second conductive layer 2 configured as a ground plane 408, and a substrate 410 sandwiched between the conductive layer 1 and the conductive layer 2. In this embodiment, a set of concentric dielectric ring resonators 404 is provided for filtering and/or multiplexing RF signals. In the embodiment shown, concentric ring resonators 404 are positioned directly on and in contact with the first conductive layer 1.

Figure 4B:
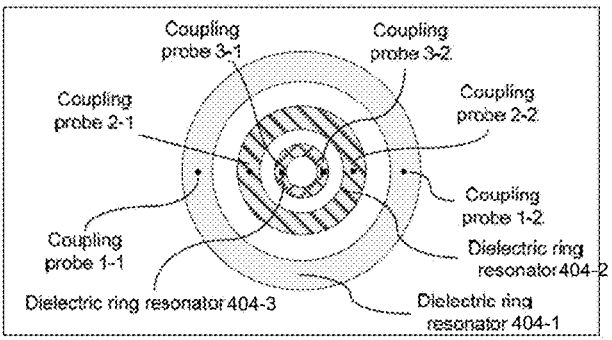
FIG. 4B illustrates a cross-sectional view of exemplary concentric dielectric ring resonators with the cross-section passing through a horizontal plane.

FIG. 4B illustrates a cross-sectional view of the exemplary concentric dielectric ring resonators 404 with the cross-section passing through a horizontal plane 420. In this example, three ring resonators are shown: the outer ring resonator 404-1, the middle ring resonator 404-2, and the inner ring resonator 404-3. In some embodiments, the outer ring resonator 404-1 has the lowest resonant frequency, while the inner ring resonator 404-3 has the highest resonant frequency. Note that the three ring resonators 404 have the same geometry center axis, i.e., they are concentrically placed.

Figure 4C:
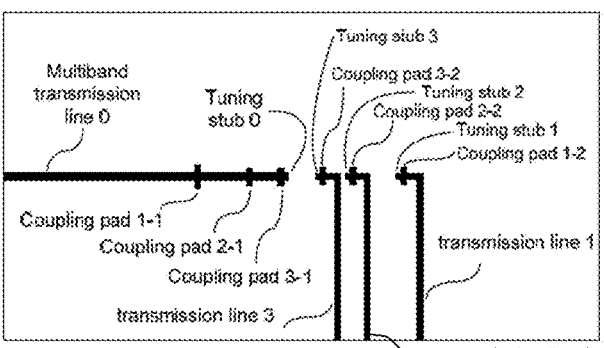
FIG. 4C illustrates a cross-sectional view of layer 1 of the transmission line structure, wherein microstrip transmission lines 0-3 are disposed on the substrate.
Figure 4D:
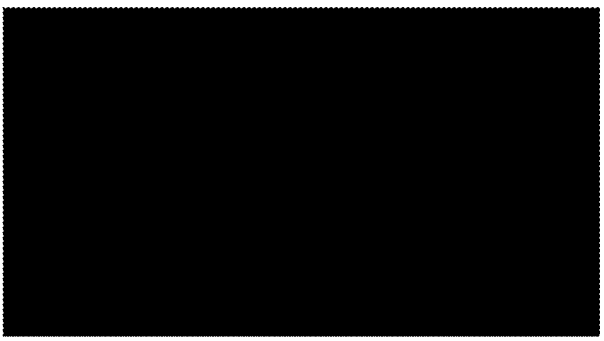
FIG. 4D illustrates a top view of the ground plane (layer 2).

FIG. 4C illustrates a cross-sectional view of the layer 1 of the transmission line structure 402, wherein microstrip transmission lines 0-3 are disposed on the substrate 410. As can be seen in FIG. 4C, transmission line structure 402 includes an input multiband transmission line 0 comprising a set of coupling pads 1-1, 2-1, and 3-1, and a tuning stub 0 at the terminal of the multiband transmission line 0. Transmission line structure 402 also includes a set of output transmission lines 1, 2, and 3, each of these transmission lines can transmit a desired bandpass signal at a RF band, for example, at Band 1, 2, or 3. Note that each of the output transmission lines also includes a tuning stub labeled as tuning stub 1, 2, 3, respectively, and a coupling pad, labeled as coupling pad 1-2, 2-2, and 3-2, respectively. FIG. 4D illustrates a top view of ground plane 408 (layer 2), with the cross-section passing through a horizontal plane 418.

Referring back to FIG. 4A and FIG. 4C, note that concentric dielectric ring resonators 404 are disposed on top of the transmission lines 0-3. For each of the coupling pads in transmission line 0 and each of the coupling pads in transmission lines 1-3, there is a coupling probe perpendicular to and in contact with the corresponding coupling pad, i.e., coupling probes 1-1, 2-1, and 3-1 corresponding to coupling pads 1-1, 2-1, and 3-1 in transmission line 0, and coupling probes 1-2, 2-2, and 3-2 corresponding to coupling pads 1-2, 2-2, and 3-2 in transmission lines 1-3, respectively. Moreover, these coupling probes are embedded in the respective ring resonators to improve the signal coupling efficiency, such that coupling probes 1-1, 2-1, and 3-1 are embedded in ring resonators 404-1, 404-2, and 404-3, respectively, and coupling probes 1-2, 2-2, and 3-2 are embedded in ring resonators 404-1, 404-2, and 404-3, respectively. The coupling pads 1-2, 2-2, and 3-2 and coupling probes 1-2, 2-2, and 3-2 can be used to electromagnetically couple a filtered bandpass RF signal from the corresponding concentric dielectric ring resonator into the corresponding transmission line i in a filtering operation mode or coupling an RF signal from transmission line i into the corresponding concentric dielectric ring resonator in a multiplexing operation mode. In some embodiments, the height of each coupling probe i-1 and i-2 (i=1, 2, 3), and physical dimensions of each tuning stub j(j=0, 1, 2, 3) and coupling pad i-1 and i-2 (i=1, 2, 3) are optimized for impedance matching so that these coupling structures are impedance matched with the corresponding transmission lines, typically designed to be 50 Ohm.

When multi-band bandpass multiplexer circuit 400 is used in the multi-band bandpass filtering operation mode, the multiband RF signals are transmitted through the transmission line 0, and coupled into each of the dielectric ring resonators 404-1, 404-2, and 404-3 through the corresponding coupling pad i-1 (i=1, 2, 3) and coupling probe i-1 (i=1, 2, 3). The multiband RF signals are subsequently filtered by the corresponding dielectric ring resonator to generate a respective bandpass signal centered at the resonant frequency of the corresponding dielectric ring resonator. The filtered RF signals are then coupled from the dielectric resonators 404-1, 404-2, and 404-3 into the transmission lines 1, 2, and 3, respectively. Due to the frequency selective characteristics of the dielectric resonators, only the desired bandpass signals can be coupled into the transmission lines 1, 2, and 3, e.g., the desired signal of Band 1 output by resonator 404-1, the desired signal of Band 2 by resonator 404-2, and the desired signal of Band 3 by resonator 404-3. Because the resonant frequencies of the dielectric ring resonators 404 can be designed to select the desired frequency bands, the transmission lines 1-3 can be used to output desired bandpass signals.

Notably, the three ring resonators 404 have the same geometrical center axis and are concentrically placed so that the real estate requirement is significantly reduced. Moreover, the coupling pads are placed directly beneath the resonators and the coupling probes are embedded inside the resonators to improve the coupling efficiency. Because the relative permittivity of the dielectric resonators can be made very high, e.g., in the order of few thousands, the Q values of the resonators can be high to obtain steep roll-off for out-off-band signal rejection. The dielectric materials between the ring resonators can have low relative permittivity to confine the electromagnetic waves inside each of the resonators. To facilitate the handling and manufacturability in the assembly using surface mounted technology, a frame, such as a cube of dielectric material with low permittivity (e.g., <2) can be added to enclose the structure of the integrated multiband bandpass multiplexer circuit 400.

The resonant frequency of a disclosed dielectric ring resonator is typically shape-dependent. For example, when using circular or elliptical ring resonators, the high-order resonant frequencies of the higher-order modes can be nonlinear functions (e.g., Bessel functions and Mathieu functions for the circular and elliptical ring structures, respectively) of the resonator dimensions. Hence, some embodiments of the integrated multiband bandpass multiplexer use circular or elliptical resonator elements to greatly reject the higher-order harmonics of the desired passbands.

Figure 5:
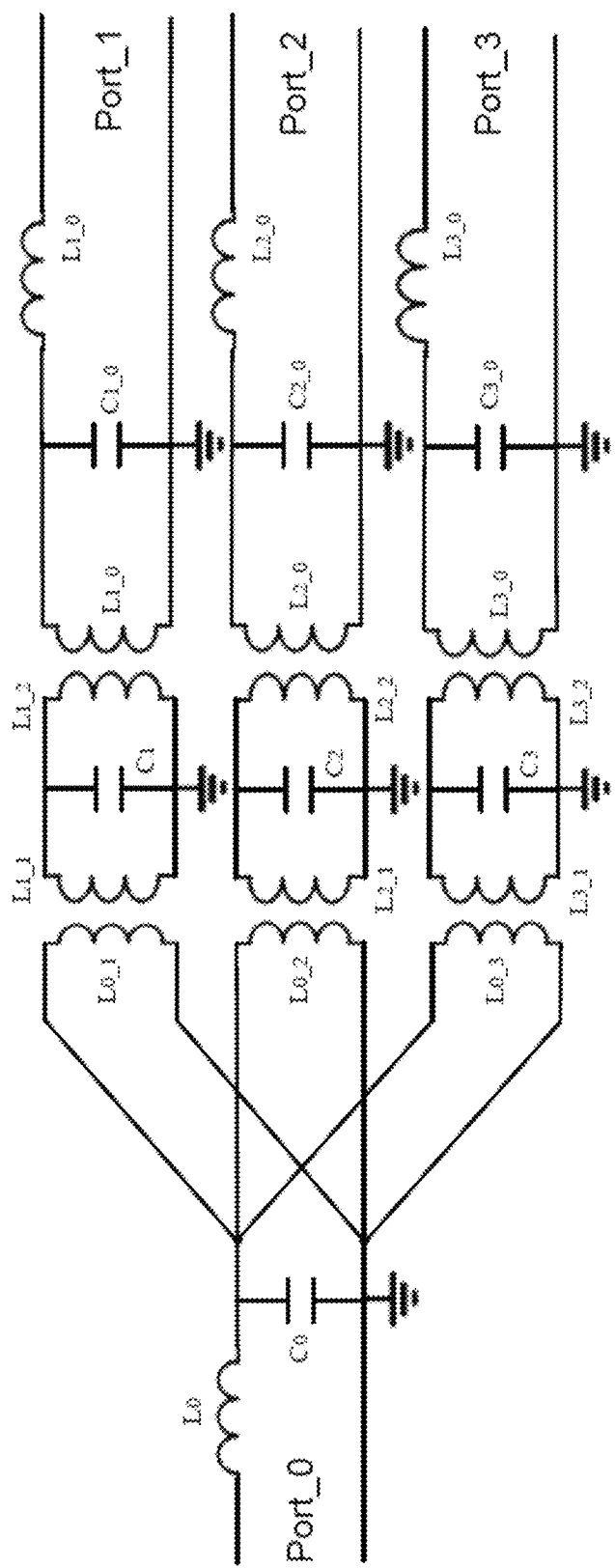
FIG. 5 shows an exemplary equivalent circuit of the integrated RF multiband bandpass multiplexer circuit in conjunction with FIGS. 4A-4D.

FIG. 5 shows an exemplary equivalent circuit of the integrated RF multiband bandpass multiplexer circuit 400 based on concentric dielectric ring resonators, as illustrated in FIGS. 4A-4D. As can be seen in FIG. 5, $L_0$ and $C_0$ represent the equivalent inductance and capacitance of the transmission line 0 including a terminal denoted as "Port_0;" $L_{1\_1}$, $L_{1\_2}$ and $C_1$ represent the equivalent inductances and capacitance of the outer ring resonator 404-1, $L_{2\_1}$, $L_{2\_2}$ and $C_2$ represent the equivalent inductances and capacitance of the middle ring resonator 404-2, and $L_{3\_1}$, $L_{3\_2}$ and $C_3$ represent the equivalent inductances and capacitance of the inner ring resonator 404-3. $L_{1\_0}$ and $C_{1\_0}$ represent the equivalent inductance and capacitance of the transmission line 1 including a terminal denoted as "Port_1;" $L_{2\_0}$ and $C_{2\_0}$ represent the equivalent inductance and capacitance of the transmission line 2 including a terminal denoted as "Port_2;" and $L_{3\_0}$ and $C_{3\_0}$ represent the equivalent inductance and capacitance of the transmission line 3 including a terminal denoted as "Port_3." As can be seen in FIG. 5, Port_0 can be used as the input port to receive the multiband RF signals including Bands 1, 2, and 3, which are then electromagnetically coupled to the dielectric resonators 1, 2, and 3. Dielectric resonators 1, 2, and 3 filter the multiband RF signals to generate the bandpass signals of Bands 1, 2, and 3, which are subsequently coupled into the output transmission lines 1, 2, and 3, and output by Port_1, Port_2, and Port_3, separately. Furthermore, ($L_{1\_1}$, $L_{1\_2}$) and $C_1$ correspond to frequency $f_1$, the central frequency of the first desired signal band; ($L_{2\_1}$, $L_{2\_2}$) and $C_2$ correspond to frequency $f_1$, the central frequency of the second desired signal band; and ($L_{3\_1}$, $L_{3\_2}$) and $C_3$ correspond to frequency $f_3$, the central frequency of the third desired signal band ($f_1<f_2<f_3$). In some embodiments, the resonant frequencies can be computed using the following equation:

$$f_i = 1/(2\pi\sqrt{L_i C_i}), \text{ where } L_i = L_{i\_1} L_{i\_2}/(L_{i\_1} + L_{i\_2}) \text{ and } i=1, 2, 3.$$

Figure 6:
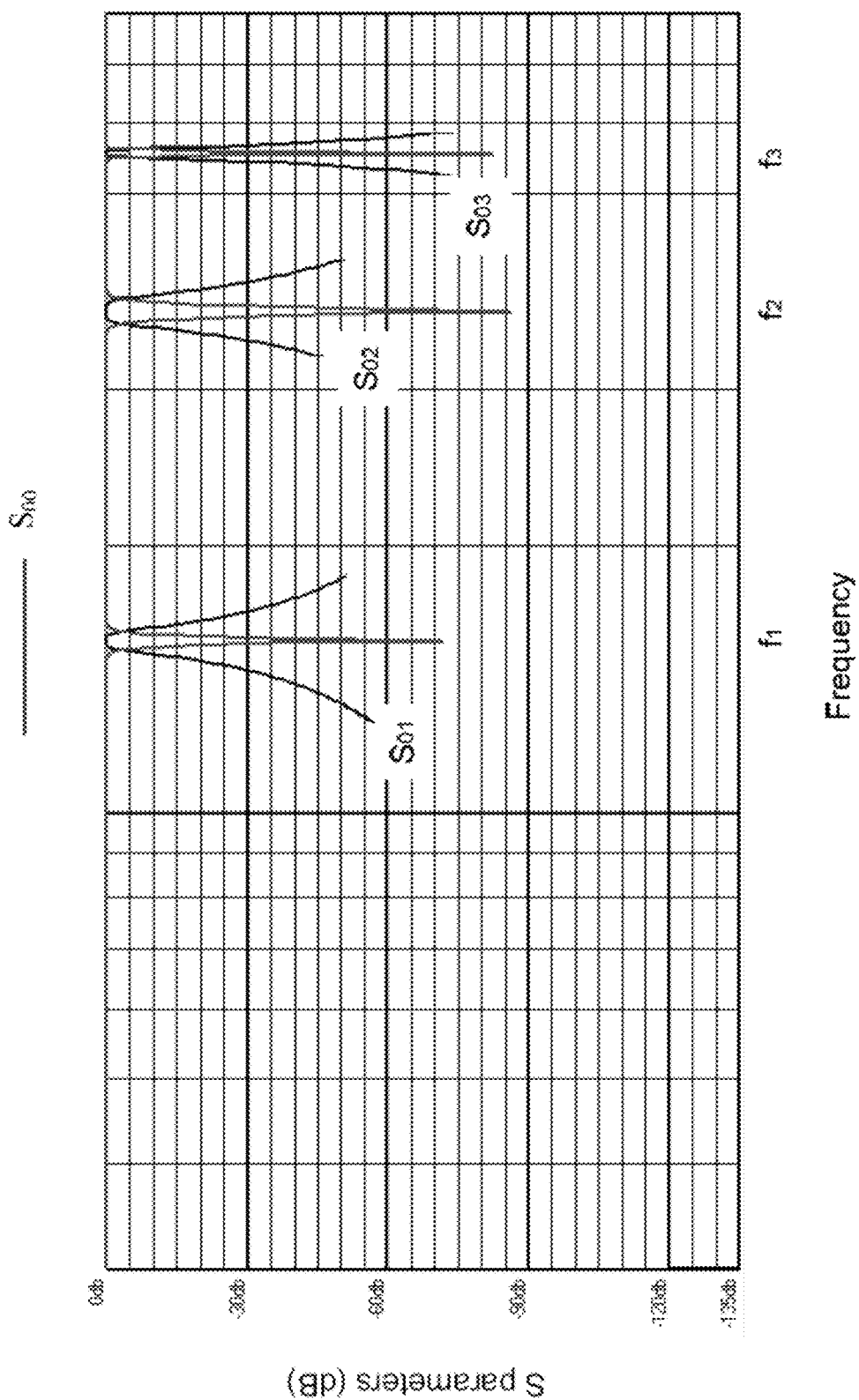
FIG. 6 shows an exemplary plot of RF transmission characteristics of an embodiment of the integrated RF multiband bandpass multiplexer circuit as illustrated in FIGS. 4A-4D.

FIG. 6 shows an exemplary plot of RF transmission characteristics of an embodiment of the integrated RF multiband bandpass multiplexer circuit as illustrated in FIGS. 4A-4D. In the plot of FIG. 6, the S parameter $S_{0j}$ (j=0, 1, 2, 3) is defined as the ratio of power at an output Port_j to the power at the input Port_0. The plot shows that the single-band bandpass signals 1, 2, and 3 are transmitted from the input terminal Port_0 of the multiband transmission line 0 to the output terminals Port_1, 2, and 3 of the transmission lines 1, 2, and 3, respectively, while the out-of-band "noise" can be filtered out with considerable attenuation at each of the output terminals. The plot also shows that the insertion loss of the integrated RF multiband bandpass multiplexer at desired frequency bands can be very small, which can be due to the high efficiency electromagnetic coupling techniques in the integrated RF multiband bandpass multiplexer. Moreover, due to the high quality factors of the dielectric resonators, steep roll-off of the S parameters can be achieved to attenuate the unwanted out-of-band signals.

Figure 7A:
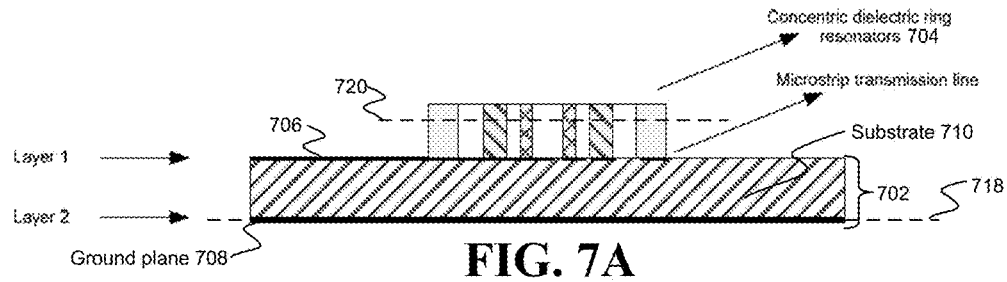
FIG. 7A illustrates a cross-sectional view of exemplary multi-band bandpass multiplexer circuit using a direct coupling mechanism to couple RF signals.

FIGS. 7A, 7B, 7C and 7D show an exemplary embodiment of an integrated RF multiband bandpass multiplexer circuit 700 based on concentric ring resonators and using direct coupling between the ring resonators and the transmission lines. More specifically, FIG. 7A illustrates a cross-sectional view of exemplary multi-band bandpass multiplexer circuit 700 using direct coupling mechanism to couple RF signals. The multi-band bandpass multiplexer circuit 700 includes a transmission line structure 702 for guiding electromagnetic signals. Transmission line structure 702 acts as or corresponds to both the input and output conductive lines in FIG. 1. Transmission line structure 702 further includes a first conductive layer 1 configured as a microstrip transmission line 706, a second conductive layer 2 configured as a ground plane 708, and a substrate 710 sandwiched between the conductive layer 1 and the conductive layer 2. In this embodiment, a set of concentric ring resonators 704 is provided for filtering and/or multiplexing RF signals. In the embodiment shown, concentric ring resonators 704 are positioned on the conductive layer 1 of the microstrip transmission line structure 702 which includes the transmission lines 0, 1, 2, and 3.

Figure 7B:
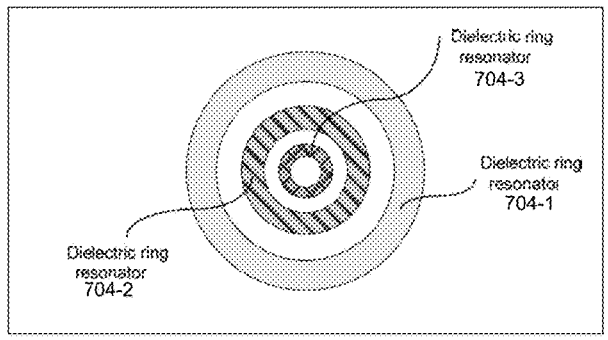
FIG. 7B illustrates a cross-sectional view of exemplary concentric dielectric ring resonators with the cross-section passing through a horizontal plane.

FIG. 7B illustrates a cross-sectional view of exemplary concentric dielectric ring resonators 704 with the cross-section passing through a horizontal plane 720. In this example, three ring resonators are shown: the outer ring resonator 704-1, the middle ring resonator 704-2, and the inner ring resonator 704-3. FIG. 7D illustrates a top view of ground plane 708 (layer 2), with the cross-section passing through a horizontal plane 718.

Figure 7C:
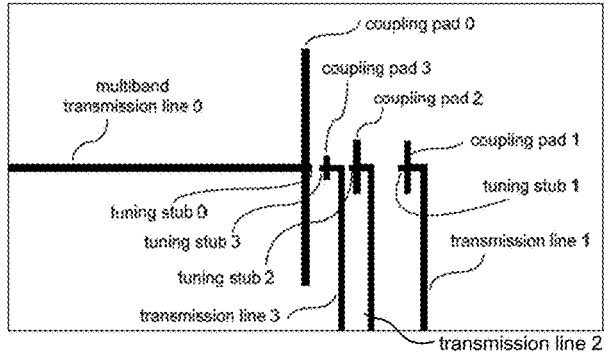
FIG. 7C illustrates a cross-sectional view of layer 1 of the transmission line structure having multiband microstrip transmission lines 0-3 disposed on the substrate.
Figure 7D:
FIG. 7D illustrates a top view of the ground plane (layer 2).

FIG. 7C illustrates a cross-sectional view of the layer 1 of the transmission line structure 702, wherein multiband microstrip transmission lines 0-3 are disposed on the substrate 710. As can be seen in FIG. 7C, transmission line structure 702 includes an input multiband transmission line 0 comprising a coupling pad 0 and a tuning stub 0 which can be used to electromagnetically couple the multiband RF signals into the set of concentric dielectric ring resonators 704 in a filtering operation mode or electromagnetically couple a set of passband RF signals from the set of concentric dielectric ring resonators 704 into the multiband transmission line 0 in a multiplexing operation mode. Note that in this embodiment, the concentric dielectric ring resonators 704 share the same coupling pad 0 and tuning stub 0, wherein coupling pad 0 is configured to physically overlap with all three ring resonators. The dimensions of the coupling pad 0 and tuning stub 0 can be designed to maximize the coupling efficiency between the transmission line 0 and the dielectric ring resonators 704.

Transmission line structure 702 also includes a set of output transmission lines 1, 2, and 3, wherein each of these transmission lines includes a coupling pad i (i=1, 2, 3) and tuning stub i (i=1, 2, 3) for electromagnetically coupling a filtered bandpass RF signal from the corresponding concentric dielectric ring resonator into the corresponding transmission line i in a filtering operation mode or coupling an RF signal from transmission line i into the corresponding concentric dielectric ring resonator in a multiplexing operation mode. In some embodiments, the dimension of the coupling pad i (i=1, 2, 3) and tuning stub i (i=1, 2, 3) can be separately optimized to maximize the coupling efficiency between the dielectric ring resonator i (i=1, 2, 3) and the corresponding transmission line i (i=1, 2, 3). Because each dielectric ring resonator can be designed to have just one fundamental resonant frequency, the corresponding transmission line can be used to transmit a single-band filtered RF signal. Furthermore, to facilitate the handling and manufacturability in the assembly using surface mounted technology, a frame, such as a cube of dielectric material with low permittivity can be added to enclose the structure of the integrated multiband bandpass multiplexer circuit 700.

Compared to the integrated multi-band bandpass multiplexer circuit 400, integrated multi-band bandpass multiplexer circuit 700 in FIG. 7 provides a simple assembling technique to mount the disclosed concentric dielectric ring resonators 704 on the transmission line structure 702 using a surface-mount technology.

Figure 8A:
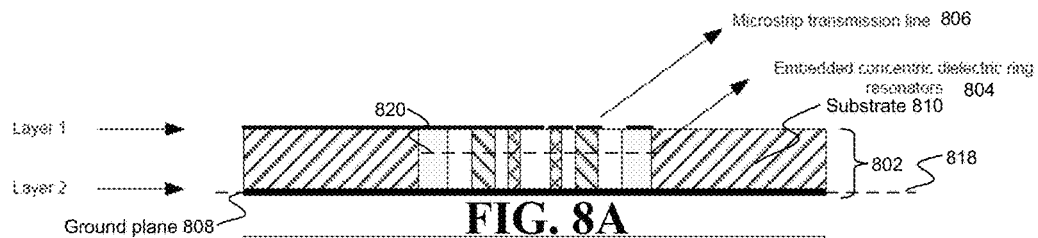
FIG. 8A illustrates a cross-sectional view of exemplary multi-band bandpass multiplexer wherein the ring resonators are embedded inside the substrate of a transmission line structure.

FIGS. 8A, 8B, 8C and 8D show exemplary integrated multi-band bandpass multiplexer circuit 800 based on concentric ring resonators and using direct coupling between the ring resonators and the transmission lines, wherein the ring resonators are embedded inside the substrate of a transmission line structure. More specifically, FIG. 8A illustrates a cross-sectional view of exemplary multi-band bandpass multiplexer 800. As can be seen in FIG. 8A, the concentric dielectric ring resonators 804 are embedded inside the substrate of the microstrip transmission line structure 802, which further includes input transmission line 0 and output transmission lines 1, 2, and 3. Transmission line structure 802 further includes a conductive layer 1 configured as a microstrip transmission line 806, a conductive layer 2 configured as a ground plane 808, and a substrate 810 sandwiched between the conductive layer 1 and the conductive layer 2.

Figure 8B:
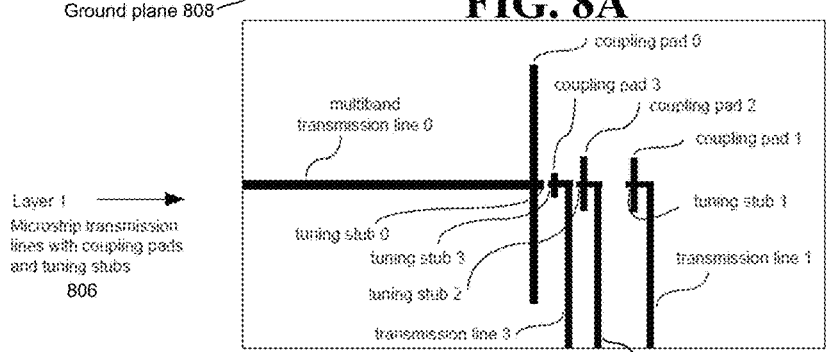
FIG. 8B illustrates a cross-sectional view of layer 1 of the microstrip transmission line structure having multiband microstrip transmission lines 0-3 disposed on the substrate.

FIG. 8B illustrates a cross-sectional view of the layer 1 of microstrip transmission line structure 802, wherein multiband microstrip transmission lines 0-3 are disposed on the substrate 810. As can be seen in FIG. 8B, transmission line structure 802 includes an input multiband transmission line 0 comprising a coupling pad 0 and a tuning stub 0 which can be used to electromagnetically couple the multiband RF signals into the concentric dielectric ring resonators 804 in a filtering operation mode, or electromagnetically couple a set of passband RF signals from the set of concentric dielectric ring resonators 804 into the multiband transmission line 0 in a multiplexing operation mode. Note that in this embodiment, the concentric dielectric ring resonators 804 share the same coupling pad 0 and tuning stub 0, wherein coupling pad 0 is configured to physically overlap with all three ring resonators. The dimensions of the coupling pad 0 and tuning stub 0 can be designed to maximize the coupling efficiency between the transmission line 0 and the dielectric ring resonators 804.

Transmission line structure 802 also includes a set of output transmission lines 1, 2, and 3, wherein each of these transmission lines includes a coupling pad i (i=1, 2, 3) and a tuning stub i (i=1, 2, 3) for electromagnetically coupling a filtered bandpass RF signal from the corresponding concentric dielectric ring resonator into the corresponding transmission line i in a filtering operation mode or coupling an RF signal from transmission line i into the corresponding concentric dielectric ring resonator in a multiplexing operation mode. In some embodiments, the dimension of the coupling pad i (i=1, 2, 3) and tuning stub i (i=1, 2, 3) can be separately optimized to maximize the coupling efficiency between the dielectric ring resonator i (i=1, 2, 3) and the corresponding transmission line i (i=1, 2, 3). Because each dielectric ring resonator can be designed to have just one fundamental resonant frequency, the corresponding transmission line can be used to transmit a single-band filtered RF signal.

Figure 8C:
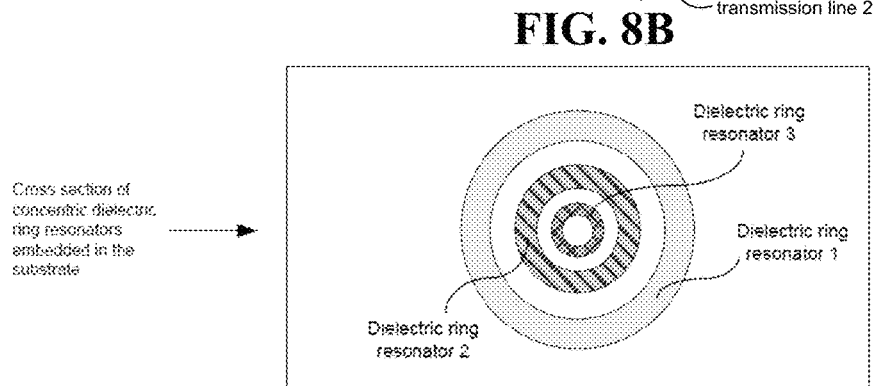
FIG. 8C illustrates a cross-sectional view of exemplary concentric dielectric ring resonators.
Figure 8D:
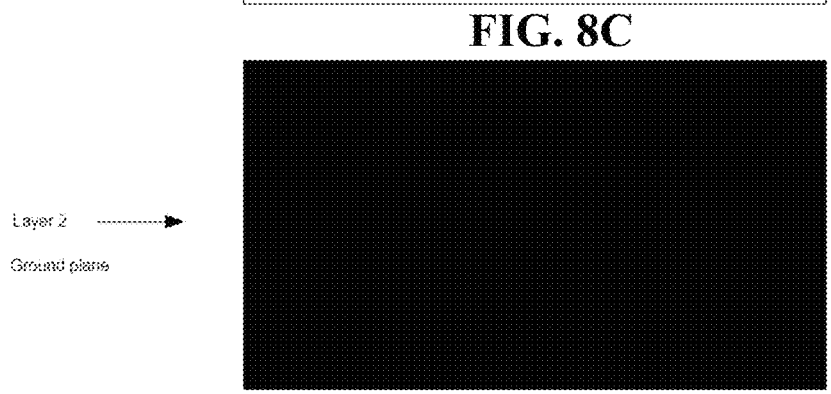
FIG. 8D illustrates a cross-sectional view of the ground plane.

FIG. 8C illustrates a cross-sectional view of the exemplary concentric dielectric ring resonators with the cross-section passing through a horizontal plane 820. FIG. 8D illustrates a top view of ground plane 808 (layer 2), with the cross-section passing through a horizontal plane 818.

FIGS. 9A, 9B, 9C and 9D show exemplary integrated multi-band bandpass multiplexer circuit 900 based on concentric ring resonators and using a slot coupling mechanism between the ring resonators and the transmission lines. More specifically, FIG. 9A illustrates a cross-sectional view of exemplary multi-band bandpass multiplexer circuit 900. The multi-band bandpass multiplexer 900 includes a transmission line structure 902 for guiding electromagnetic signals and acts as or corresponds to both the input and output conductive lines illustrated in FIG. 1. Transmission line structure 902 further includes a conductive layer 1 configured as a ground plane 908 having a plurality of coupling slots, and a conductive layer 2 including input and output transmission lines 906, and a substrate 910 sandwiched between the first conductive layer 1 and the second conductive layer 2. In this embodiment, a set of concentric ring resonators 904 is provided for filtering electromagnetic signals. The concentric dielectric ring resonators 904 are positioned on top of the ground plane 908 of the transmission line structure 902 and further away from the second conductive layer 2. FIG. 9B illustrates a cross-sectional view of exemplary concentric dielectric ring resonators 904 with the cross-section passing through a horizontal plane 920. FIG. 9C illustrates a top view of ground plane 908 (layer 1) having a plurality of coupling slots 0, 1, 2, and 3. Note that coupling slot 0 is configured to be sufficiently long so that it is shared by the set of concentric ring resonators 904.

FIG. 9D illustrates a cross-sectional view of the conductive layer 2 including the signal traces of input multiband transmission line 0, and output transmission lines 1, 2, and 3. The transmission line 0 also includes coupling arm 0 which can be used to electromagnetically couple the multiband RF signals (e.g., RF bands 1, 2, 3) through the shared coupling slot 0 into each of the concentric dielectric ring resonators 904 in a filtering operating mode, or electromagnetically couple a set of passband RF signals from the set of concentric dielectric ring resonators 904 into the multiband transmission line 0 in a multiplexing operation mode. That is, the set of concentric dielectric ring resonators 904 share both the coupling arm 0 and the coupling slot 0 for which electromagnetically coupling RF signals between the transmission line 0 and the concentric dielectric ring resonators 904.

In some embodiments, the dimensions of the coupling arm 0 can be designed to maximize the coupling efficiency between the transmission line 0 and the set of dielectric ring resonators 904. The output transmission line i (i=1, 2, 3) further includes the coupling arm i (i=1, 2, 3) in layer 2 and coupling slot i (i=1, 2, 3) in layer 1. The combined structure of a coupling arm i and a corresponding coupling slot i is configured to electromagnetically couple a filter RF single-band signal from the concentric dielectric ring resonator i into the corresponding transmission line in a filtering operation mode or coupling an RF signal from transmission line i into the corresponding concentric dielectric ring resonator in a multiplexing operation mode. The dimensions of the coupling arm i (i=1, 2, 3) and coupling slot i (i=1, 2, 3) can be separately optimized to maximize the coupling efficiency between the dielectric ring resonator i (i=1, 2, 3) and the corresponding transmission line i (i=1, 2, 3).

Because each dielectric ring resonator can be designed to have just one fundamental resonant frequency, the corresponding transmission line can be used to transmit a single-band filtered RF signal. Furthermore, to facilitate the handling and manufacturability in the assembly using surface mounted technology, a frame, such as a cube of dielectric material with low permittivity can be added to enclose the structure of the integrated multiband bandpass multiplexer circuit 900. Moreover, because the ground plane 908 with the coupling slots separates the signal traces and the concentric dielectric ring resonators, the signal traces can be implemented using coplanar waveguide transmission line, stripline, or any other types of transmission lines, thereby providing design flexibility for these signal traces.

Figure 10:
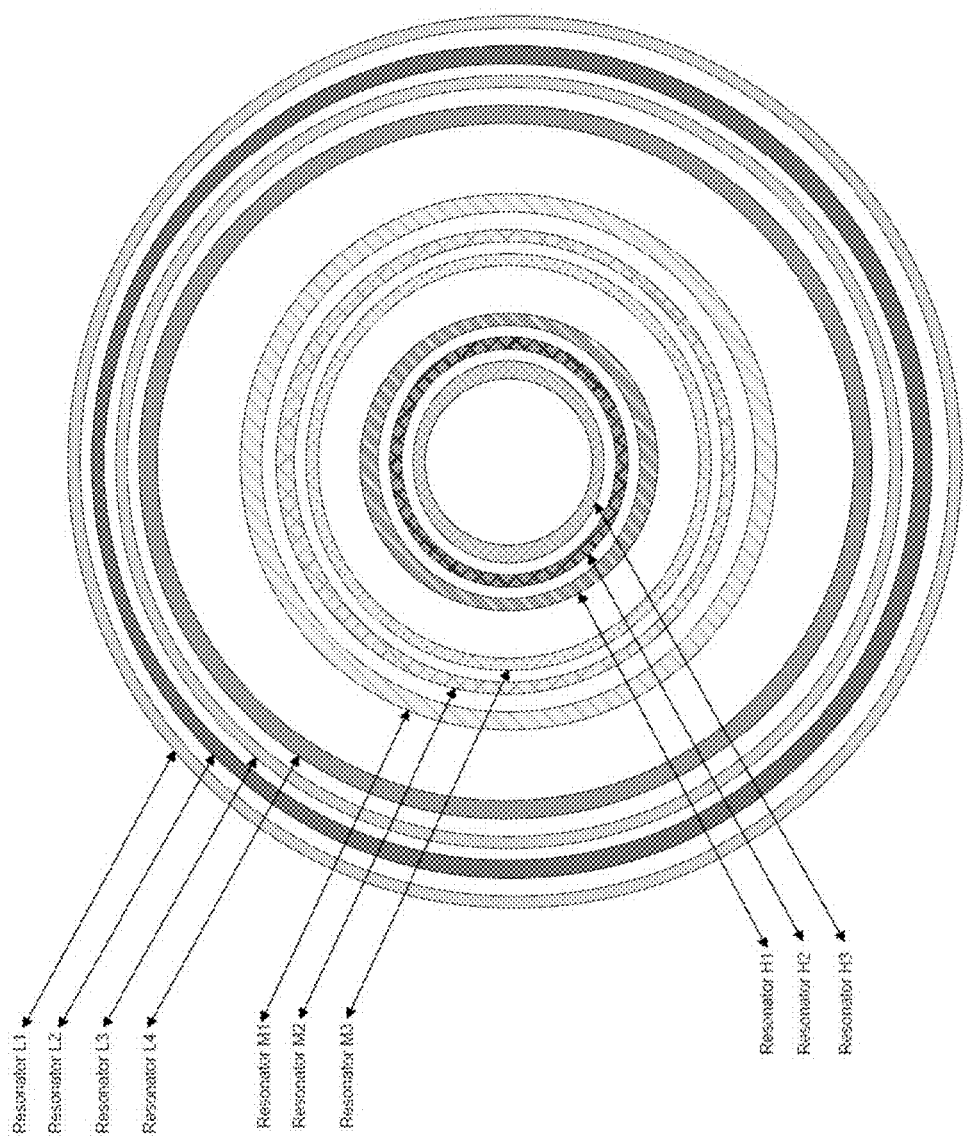
FIG. 10 illustrates the cross-sectional view of exemplary arrangement of a plurality of concentric ring resonators to extend the operation bandwidth of each passband.

FIG. 10 illustrates the cross-sectional view of an exemplary arrangement of a plurality of concentric ring resonators to extend the operation bandwidth of each passband. In this example, the resonant frequencies of the multiple ring resonators in each passband are slightly separated from each other so that these resonators in a given passband produce an overall bandpass having desired and wide operating bandwidth. As shown in FIG. 10, a first group of concentric ring resonators (L1, L2, L3, L4) having similar but slightly different sizes are designed to form a first composite resonator with a low-frequency band, referred to as "band L"; a second group of concentric ring resonators (M1, M2, M3) having similar but slightly different sizes are designed to form a second composite resonator with a middle-frequency band, referred to as "band M"; and a third group of concentric ring resonators (H1, H2, H3) having similar but slightly different sizes are designed to form a third composite resonator with a high-frequency band, referred to as "band H". For each of the composite resonators shown in FIG. 10, the corresponding set of concentric ring resonators can be formed of a dielectric material with a refractive index higher than the dielectric material used to fill the interspatial gaps between these concentric ring resonators.

Figure 11:
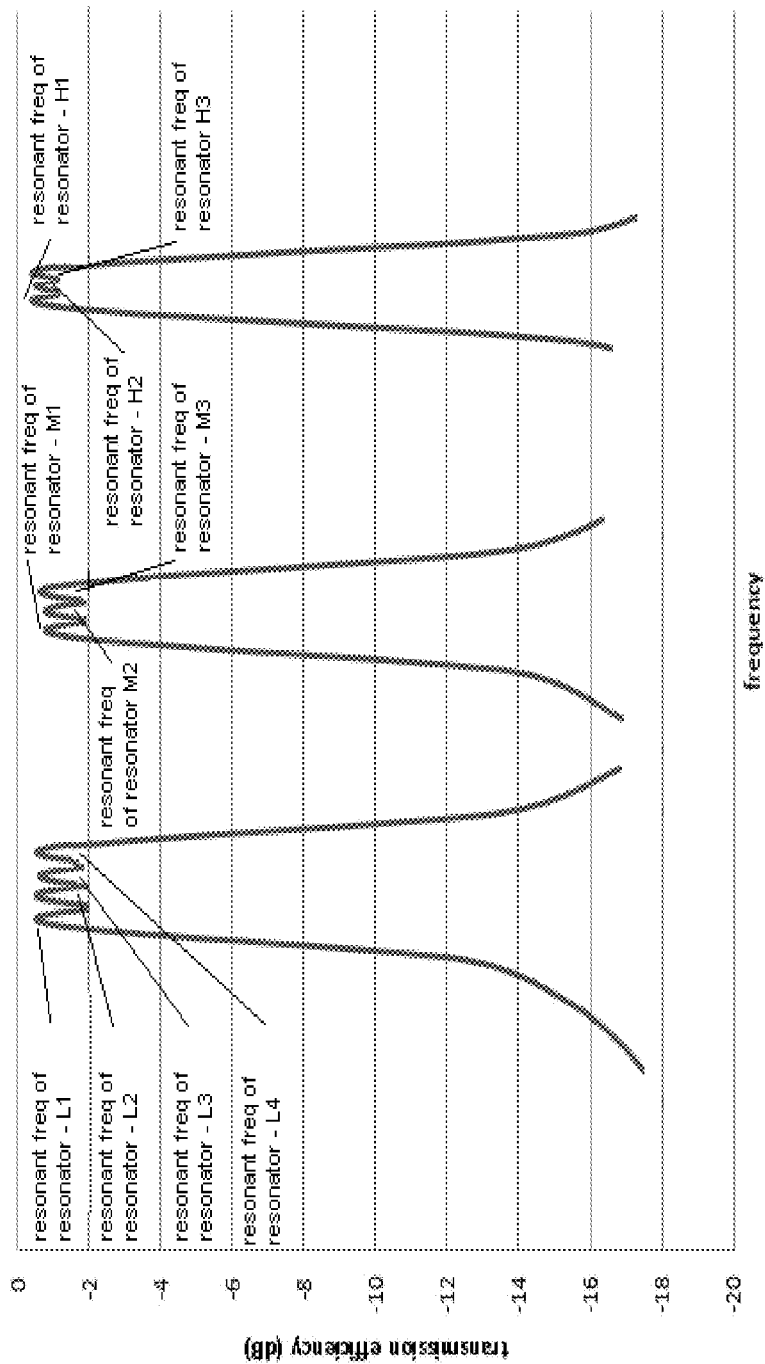
FIG. 11 illustrates a plot of exemplary transmission characteristics of the plurality of the concentric ring resonators illustrated in FIG. 10.

FIG. 11 illustrates a plot of exemplary transmission characteristics of the plurality of the concentric ring resonators illustrated in FIG. 10. More specifically, FIG. 11 shows that the bandwidths of the multiple bandpass multiplexer are extended in each of the operation band (bands L, M, H) by using a plurality of resonator elements with closely spaced but different resonant frequencies. For example, for the band L, the overall bandwidth is the combined bandwidths of individual ring resonators (L1, L2, L3, L4); and for the band M and band H, the overall bandwidths are the combined bandwidths of individual ring resonators (M1, M2, M3), (H1, H2, H3), respectively. Hence, for each of the designed passband, a desired wider or narrower overall bandwidth can be achieved by including greater or fewer number of ring resonators. To facilitate the assembly of these resonator elements in the practical applications, the interspatial gaps among these resonator elements may be filled with a material having low dielectric constant.

Figure 12:
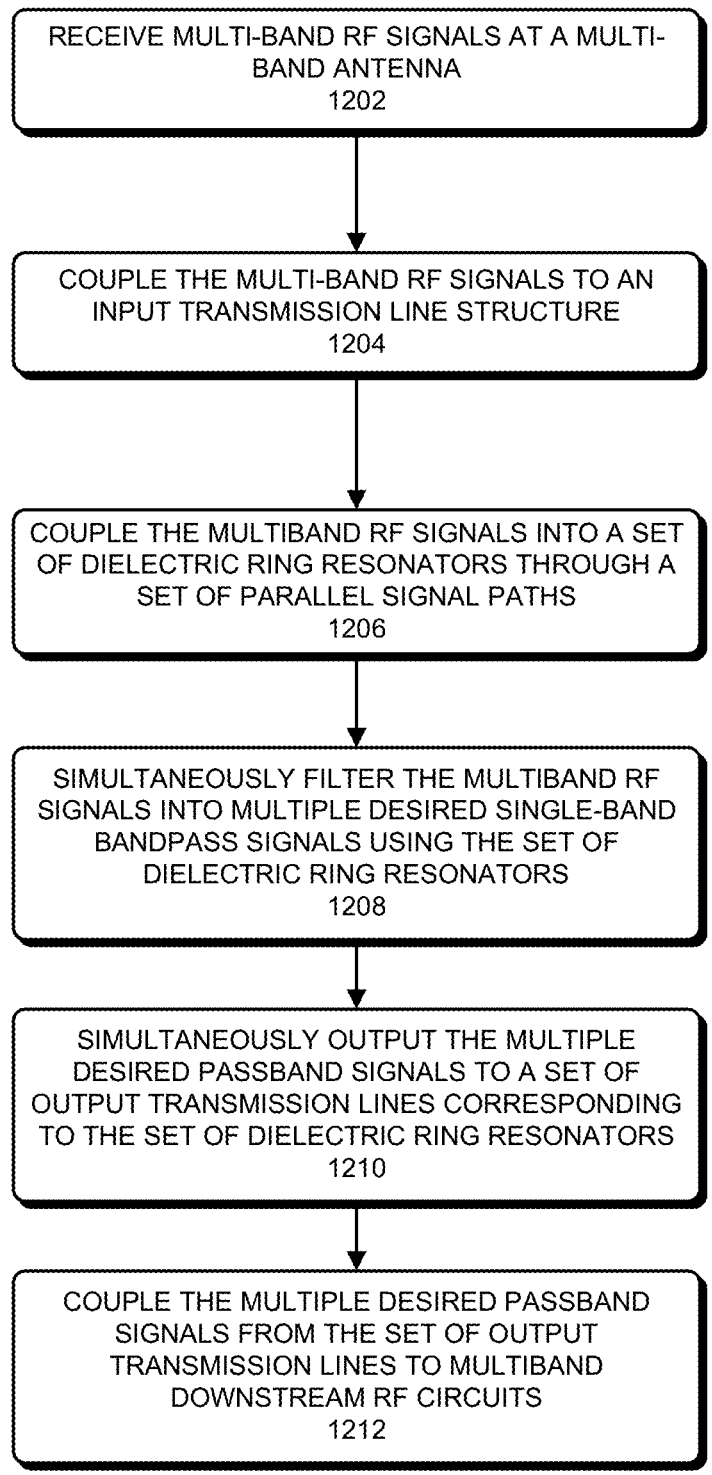
FIG. 12 presents a flowchart illustrating exemplary process for filtering and distributing multiband RF signals within a multiband RF communication device.

FIG. 12 presents a flowchart illustrating an exemplary process for filtering and distributing multiband RF signals within a multiband RF communication device. This process includes receiving multiband RF signals at a multiband antenna (1202) and subsequently coupling the multiband RF signals into an input transmission line structure (1204). In one embodiment, the input transmission line structure includes a single conductive signal line. The input transmission line structure then couples the multiband RF signals into a plurality of parallel signal paths, e.g., using a set of coupling pads, which then couple the multiband RF signals into a plurality of dielectric ring resonators (1206). The plurality of dielectric ring resonators simultaneously filter the multiband RF signals into multiple desired single-band bandpass signals based on the designed resonant frequencies of the dielectric ring resonators (1208). The plurality of dielectric ring resonators then simultaneously output the multiple desired passband signals to a plurality of output transmission lines (1210). In some embodiments, each of the plurality of dielectric ring resonators outputs a desired passband signal to a corresponding transmission line within the plurality of output transmission lines. The plurality of output transmission lines then couple the multiple desired passband signals to multiband downstream RF circuits (1212).

Figure 13:
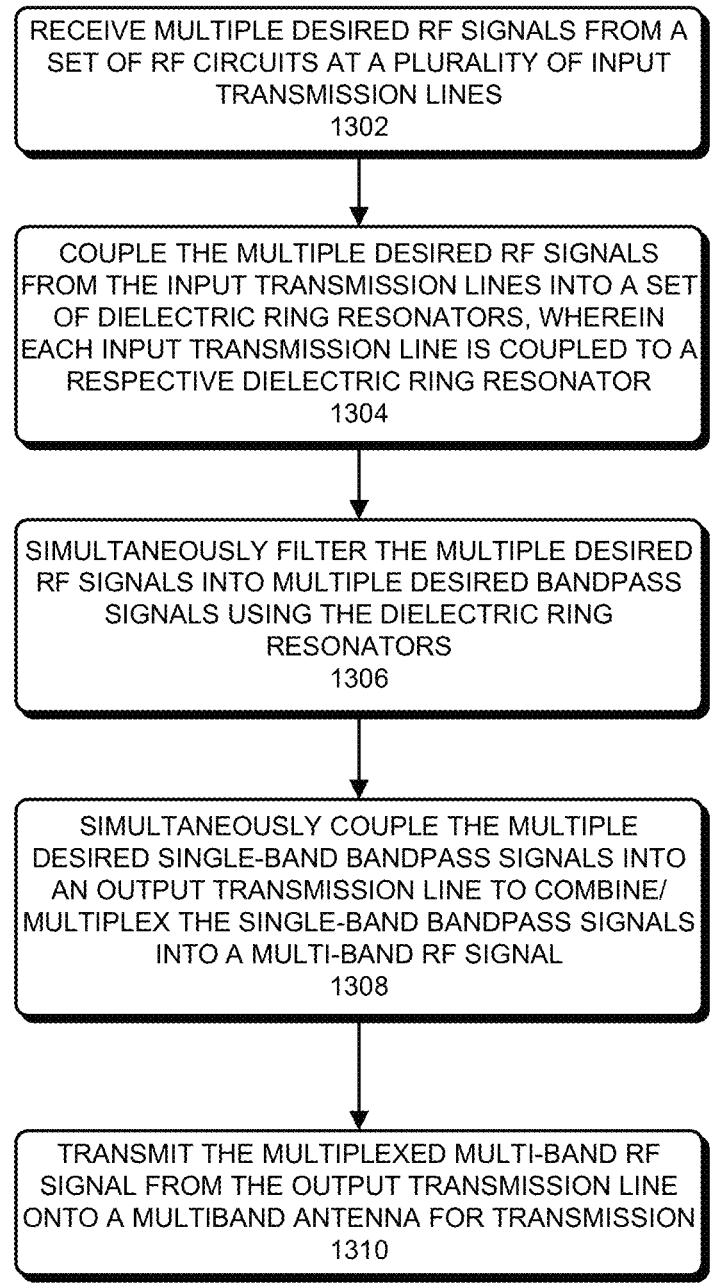
FIG. 13 presents a flowchart illustrating exemplary process for multiplexing multiple single-band RF signals within a multiband RF communication device.

FIG. 13 presents a flowchart illustrating an exemplary process for multiplexing multiple single-band RF signals within a multiband RF communication device. This process includes receiving multiple desired RF signals from a set of RF circuits at a plurality of input transmission lines (1302). For example, the set of RF circuits can include one or more TDD front-end modules and radio transceivers, one or more FDD front-end modules and radio transceivers, WiFi modules, among others. The process also includes coupling the multiple desired RF signals from the plurality of input transmission lines into a set of dielectric ring resonators of different sizes and different resonant frequencies, wherein each input transmission line is coupled to a respective dielectric ring resonator (1304). The set of dielectric ring resonators simultaneously filter the multiple desired RF signals into multiple desired bandpass signals based on the designed resonant frequencies of the dielectric ring resonators (1306). The set of dielectric ring resonators then simultaneously couple the multiple desired single-band bandpass signals into a single output transmission line to combine/multiplex the single-band bandpass signals into a multi-band RF signal (1308). Next, the output transmission line transmits the multiplexed multi-band RF signal onto a multiband antenna for transmission (1310). Note that the disclosed processes in conjunction with FIGS. 12 and 13 can be implemented on the same integrated RF multiband bandpass multiplexer circuit, such as each of the integrated RF multiband bandpass multiplexer circuits 100, 400, 700, 800, 900, wherein the two processes are performed in two opposite directions and operation modes of the circuit.

Figure 14:
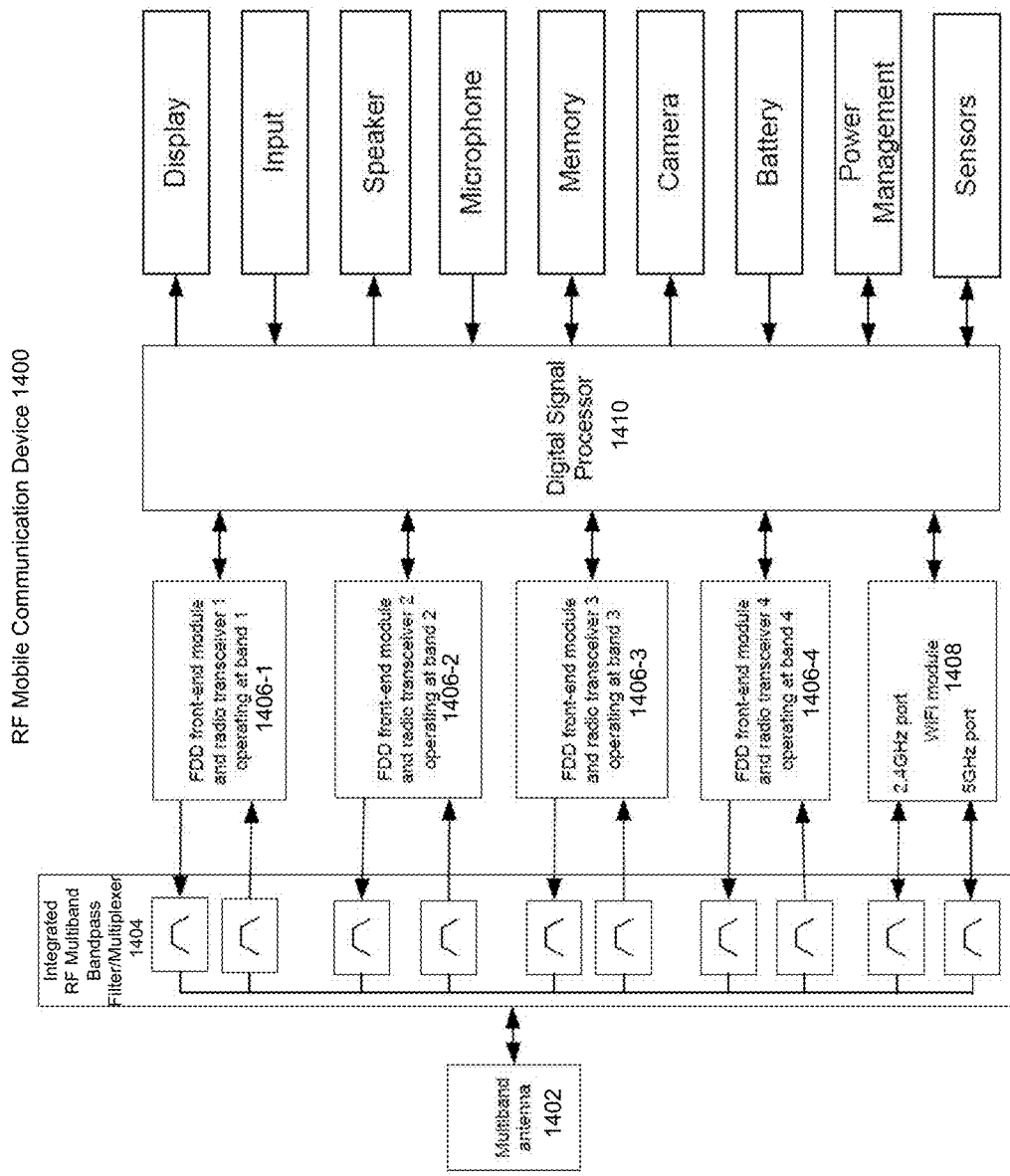
FIG. 14 presents an exemplary RF mobile communication device using the disclosed integrated RF multiband bandpass multiplexer circuit.

FIG. 14 presents an exemplary RF mobile communication device 1400 using the disclosed integrated RF multiband bandpass multiplexer circuit. Such a mobile communication device is operable to simultaneously transmit and receive multiband signals at RF signal bands that have either different or the same communication protocols (e.g., LTE, WCDMA, CDMA). As can be seen in FIG. 14, mobile communication device 1400 includes a multiband antenna 1402 and an integrated RF multiband bandpass multiplexer circuit 1404 based on a set of dielectric ring resonators as described in this patent document. A subset of the set of dielectric ring resonators 1404 is designed for filtering/passing cellular RF bands 1, 2, 3, and 4, and is coupled to a set of downstream RF circuits, including FDD front-end modules and transceivers 1406 operating at the cellular RF bands 1, 2, 3, and 4. Another subset of the set of dielectric ring resonators 1404 is designed for filtering/passing WiFi signals, such as the WiFi 2.4 GHz and 5 GHz radio signals, and is coupled to WiFi radio module 1408. Note that cellular RF signals and the WiFi signals are received using the same multiband antenna 1402. The cellular RF bands 1, 2, 3, 4, can include one or more frequency bands close to the WiFi 2.4 GHz band (2.4-2.4835 GHz), such as frequency bands of 2.5-2.57 GHz, 2.62-2.69 GHz, 2.57-2.62 GHz, 2.3-2.4 GHz, and 2.496-2.69 GHz. Mobile communication device 1400 also includes a processor 1410 coupled downstream from the FDD front-end modules and transceivers and WiFi radio module 1408. Processor 1410 is further coupled to a set of downstream modules which can include, but are not limited to, a display, an input, a speaker, a microphone, a memory, a camera, a battery, a power management unit, and a set of sensors. Note that one advantage of mobile communication device 1400 is that it allows for simultaneous operating with both WiFi and cellular technologies while using the same shared multiband antenna. Hence, the requirement of total number of antennae is reduced.

Figure 15:
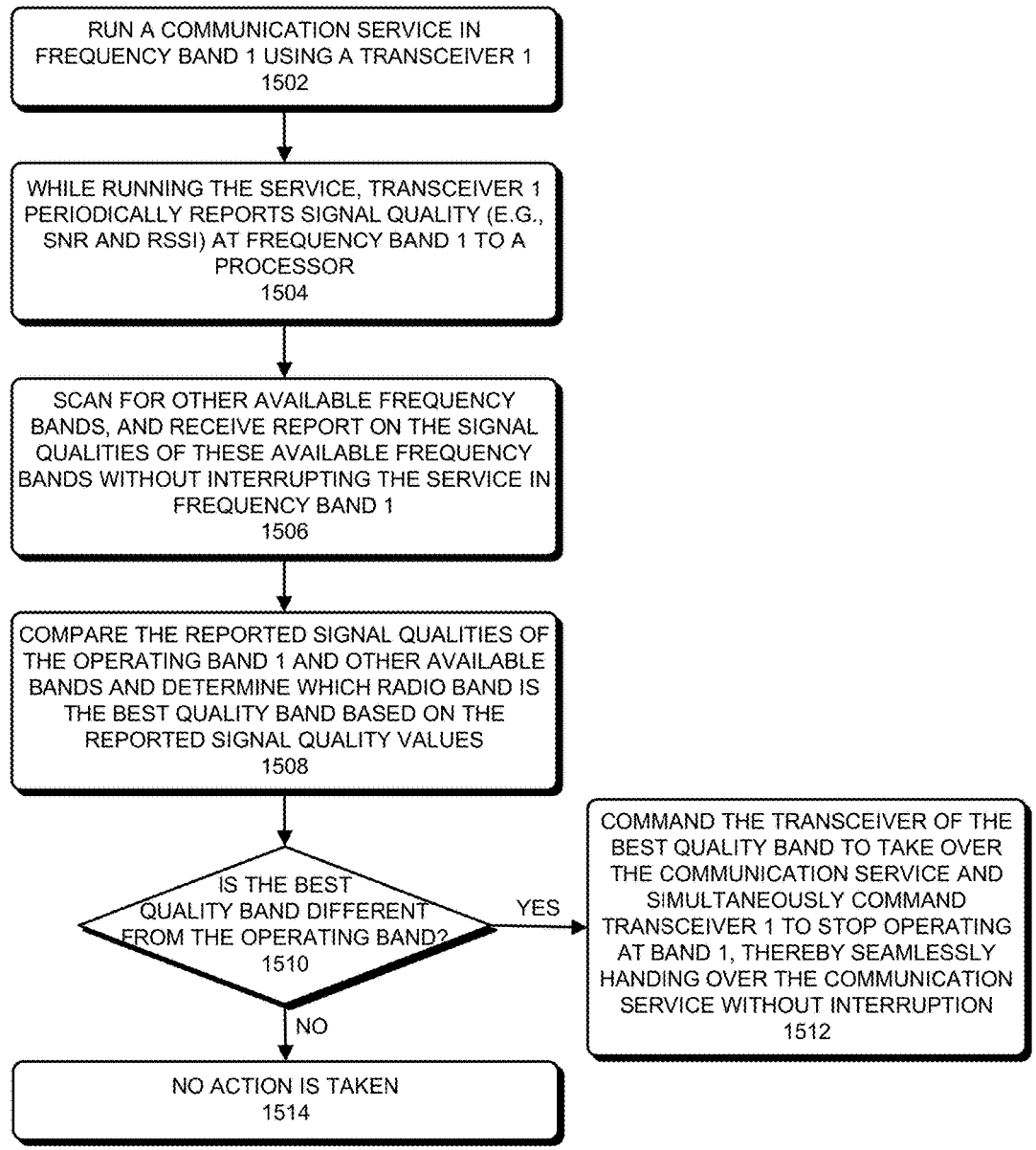
FIG. 15 presents a flowchart illustrating an exemplary process for adaptively and seamlessly handing over a communication service in a multiband radio communication device without interrupting the communication service.

FIG. 15 presents a flowchart illustrating an exemplary process for adaptively and seamlessly handing over a communication service in a multiband radio communication device, such as mobile communication device 1400 illustrated in FIG. 14, without interrupting the communication service. During operation, the mobile communication device based on the disclosed integrated RF multiband bandpass multiplexer runs a communication service in frequency band 1 using a transceiver 1 (1502). While running the communication service, transceiver 1 periodically reports signal quality (e.g., a signal-to-noise ratio (SNR) and a received signal strength indication (RSSI)) at frequency band 1 to a processor (1504). The processor is also configured to scan for other available frequency bands, such as frequency bands 2, 3, 4, etc., and receive report on the signal qualities of these available frequency bands without interrupting the service in frequency band 1 (1506). For example, the processor can command the transceivers in these available frequency bands to scan and report the signal qualities of these available frequency bands to the processor.

Next, the processor compares the reported signal quality of the operating band 1 and other available bands (e.g., 2, 3, 4), and determines which radio band is the best quality band based on the reported signal quality values (1508). Next, the processor determines whether the best quality band is different from the operating band (1510). If so, the processor commands the transceiver of the best quality band to take over the communication service and simultaneously command transceiver 1 to stop operating at band 1, thereby seamlessly handing over the communication service without interruption (1512). If the best communication quality band is the same as the operating band, no action is taken to change the operating band (1514).

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. An integrated radio frequency (RF) multi-band bandpass apparatus, comprising:
   a first RF transmission line structure for transmitting and receiving multi-band RF signals;
   a plurality of RF transmission line structures for transmitting and receiving multiple single-band RF signals; and
   a plurality of dielectric ring resonators of different sizes and different resonant frequencies electromagnetically coupled between the first RF transmission line structure and the plurality of RF transmission line structures, wherein each of the plurality of dielectric ring resonators operates as a single-band bandpass filter for generating a passband signal having a central frequency corresponding to the associated resonant frequency of the ring resonator.

2. The integrated RF multi-band bandpass apparatus of claim 1, wherein the first RF transmission line structure includes:
   a first signal trace within a first conductive layer for transmitting and receiving the multi-band RF signals;
   a second conductive layer configured as a ground plane; and
   a dielectric substrate positioned between the first conductive layer and the second conductive layer.

3. The integrated RF multi-band bandpass apparatus of claim 2, wherein the plurality of RF transmission line structures includes:
   a plurality of signal traces within the first conductive layer for transmitting and receiving the multiple single-band RF signals;
   the second conductive layer configured as a ground plane; and
   the dielectric substrate positioned between the first conductive layer and the second conductive layer.

4. The integrated RF multi-band bandpass apparatus of claim 1, wherein the plurality of dielectric ring resonators are coplanar, and concentrically positioned with substantially the same axis.

5. The integrated RF multi-band bandpass apparatus of claim 1, wherein the interspatial gaps between the plurality of dielectric ring resonators are filled with a low dielectric constant material.

6. The integrated RF multi-band bandpass apparatus of claim 1, wherein the plurality of dielectric ring resonators are embedded in an outer frame filled with a low dielectric constant material.

7. The integrated RF multi-band bandpass apparatus of claim 2, wherein the plurality of dielectric ring resonators are positioned on top of the first conductive layer to be further away from the second conductive layer.

8. The integrated RF multi-band bandpass apparatus of claim 7, wherein the plurality of dielectric ring resonators are electromagnetically coupled to the first signal trace through direct contact.

9. The integrated RF multi-band bandpass apparatus of claim 7, further comprising a coupling structure between the first signal trace and each of the plurality of dielectric ring resonators, wherein the coupling structure includes:
   a conductive coupling pad disposed along and in contact with the first signal trace in the first conductive layer; and
   a conductive probe perpendicular to and in contact with the conductive coupling pad, wherein the conductive probe is embedded in the corresponding dielectric ring resonator for electromagnetically coupling the multi-band RF signals from the first signal trace into the dielectric ring resonator through the conductive coupling pad.

10. The integrated RF multi-band bandpass apparatus of claim 7, wherein the first signal trace includes a tuning stub at an end of the first signal trace which is used for impedance matching between the first signal trace and the set of conductive coupling pads and the set of conductive probes.

11. The integrated RF multi-band bandpass apparatus of claim 3, wherein the plurality of dielectric ring resonators are positioned on top of the plurality of signal traces in the first conductive layer.

12. The integrated RF multi-band bandpass apparatus of claim 11, wherein the plurality of dielectric ring resonators are electromagnetically coupled to the plurality of signal traces through direct contact.

13. The integrated RF multi-band bandpass apparatus of claim 11, further comprising a coupling structure between each of the plurality of dielectric ring resonators and a corresponding signal trace in the plurality of signal traces of the RF transmission line structures, wherein the coupling structure includes:
   a conductive coupling pad disposed along and in contact with the corresponding signal trace; and
   a conductive probe perpendicular to and in contact with the conductive coupling pad, wherein the conductive probe is embedded in the corresponding dielectric ring resonator for electromagnetically coupling a single-band RF signal between the corresponding signal trace in the plurality of signal traces and the corresponding dielectric ring resonator through the conductive coupling pad.

14. The integrated RF multi-band bandpass apparatus of claim 13, wherein each of the plurality of signal traces includes a tuning stub at an end of the signal trace which is used for impedance matching between the signal trace and corresponding conductive coupling pad and the conductive probe.

15. The integrated RF multi-band bandpass apparatus of claim 7, further comprising a coupling structure between the first signal trace and the plurality of dielectric ring resonators, wherein the coupling structure includes a conductive coupling pad in contact with the first signal trace in the first conductive layer, and wherein the conductive coupling pad is configured with a dimension physically overlapping the plurality of dielectric ring resonators for electromagnetically coupling the multi-band RF signals from the first signal trace into each of the plurality of dielectric ring resonators.

16. The integrated RF multi-band bandpass apparatus of claim 2, wherein
the plurality of dielectric ring resonators are embedded in the dielectric substrate between the first conductive layer and the second conductive layer and electromagnetically coupled to the first signal trace through direct contact.

17. The integrated RF multi-band bandpass apparatus of claim 16, further comprising a coupling structure between the first signal trace and the plurality of dielectric ring resonators, wherein the coupling structure includes a conductive coupling pad in contact with the first signal trace in the first conductive layer, and wherein the conductive coupling pad is configured with a dimension to be shared by the plurality of dielectric ring resonators for electromagnetically coupling the multi-band RF signals from the first signal trace into each of the plurality of dielectric ring resonators.

18. The integrated RF multi-band bandpass apparatus of claim 16, further comprising a coupling structure between each of the plurality of dielectric ring resonators and a corresponding signal trace in the plurality of signal traces of the plurality of RF transmission line structures, wherein the coupling structure includes a conductive coupling pad in contact with the corresponding signal trace in the first conductive layer and electromagnetically coupling a single-band RF signal between the corresponding signal trace in the plurality of signal traces and the corresponding dielectric ring resonator through the conductive coupling pad.

19. The integrated RF multi-band bandpass apparatus of claim 3, wherein the ground plane of the second conductive layer includes a first coupling slot positioned to at least partially overlap the first signal trace and a plurality of coupling slots positioned so that each of the plurality of coupling slots at least partially overlaps with a corresponding signal trace in the plurality of signal traces.

20. The integrated RF multi-band bandpass apparatus of claim 19, wherein the plurality of dielectric ring resonators are positioned on top of the second conductive layer away from the first conductive layer, and each of the plurality of dielectric ring resonators is electromagnetically coupled to the first signal trace through the first coupling slot for transmitting and receiving the multi-band RF signals, and each of the plurality of dielectric ring resonators is electromagnetically coupled to a corresponding signal trace in the plurality of signal traces through a corresponding coupling slot in the plurality of coupling slots for transmitting and receiving a single-band RF signals.

21. The integrated RF multi-band bandpass apparatus of claim 19, wherein the first coupling slot and the plurality of coupling slots are etched into the second conductive layer.

22. The integrated RF multi-band bandpass apparatus of claim 1, wherein the plurality of dielectric ring resonators are made of high quality factor (Q) dielectric materials associated with a high relative permittivity so that out-of-band spurious emission and harmonic emission and interference are significantly attenuated in each of the generated passband signals.

23. The integrated RF multi-band bandpass apparatus of claim 1, wherein the plurality of dielectric ring resonators of different sizes and different resonant frequencies include two or more subgroups of ring resonators, wherein each subgroup of ring resonators includes two or more ring resonators of closely-spaced resonant frequencies, wherein the two or more ring resonators operate as a single wideband bandpass filter having a bandwidth substantially equal to a combined bandwidth of the two or more ring resonators.

24. A multiband RF communication device, comprising:
a multiband antenna for transmitting and receiving multi-band RF signals;
an integrated RF multi-band bandpass apparatus including:
a first RF transmission line structure coupled to the multiband antenna for transmitting and receiving the multi-band RF signals;
a plurality of RF transmission line structures for transmitting and receiving multiple single-band RF signals; and
a plurality of dielectric ring resonators of different sizes and different resonant frequencies electromagnetically coupled between the first RF transmission line structure and the plurality of RF transmission line structures for generating the multiple single-band RF signals, wherein each of the plurality of dielectric ring resonators operates as a single-band bandpass filter for generating a passband signal having a central frequency corresponding to the associated resonant frequency of the ring resonator;
a plurality of multi-band RF transceivers coupled to the plurality of RF transmission line structures for transmitting and receiving the multiple single-band RF signals; and
a processor coupled to the plurality of multi-band RF transceiver circuits for processing the multiple single-band RF signals.

25. The multiband RF communication device of claim 24, wherein each of the plurality of multi-band RF transceivers transmits and receives an RF signal corresponding to a passband signal associated with one of the plurality of dielectric ring resonators.

26. The multiband RF communication device of claim 24, wherein the integrated RF multi-band bandpass apparatus operates to simultaneously filter the received multi-band RF signals into the multiple single-band bandpass signals corresponding to the multiple resonant frequencies of the plurality of dielectric ring resonators.

27. The multiband RF communication device of claim 24, wherein the integrated RF multi-band bandpass apparatus operates to simultaneously output the multiple single-band bandpass signals to the plurality of multi-band RF transceivers.

28. The multiband RF communication device of claim 24, wherein the received multi-band RF signals include a combination of at least some of the following RF bands: CDMA bands, GSM bands, WCDMA bands, TD-SCDMA bands, FDD LTE bands, TDD LTE bands, GPS bands, and WiFi bands.

29. The multiband RF communication device of claim 24, wherein each of the plurality of dielectric ring resonators operates to simultaneously receive each of the multi-band RF signals.

30. The multiband RF communication device of claim 24, wherein the plurality of dielectric ring resonators are coplanar, and concentrically positioned with the same axis.

31. The multiband RF communication device of claim 24, wherein the interspatial gaps between the plurality of dielectric ring resonators are filled with a low dielectric constant material.

32. The multiband RF communication device of claim 24, wherein the plurality of dielectric ring resonators are embedded in an outer frame filled with a low dielectric constant material.

33. The multiband RF communication device of claim 24, wherein the plurality of dielectric ring resonators of different sizes and different resonant frequencies include two or more subgroups of ring resonators, wherein each subgroup of ring resonators includes two or more ring resonators of closely-spaced resonant frequencies, wherein the two or more ring resonators operate as a single wideband bandpass filter having a bandwidth substantially equal to a combined bandwidth of the two or more ring resonators.

34. The multiband RF communication device of claim 24, wherein the processor operates to periodically command the plurality of multi-band RF transceivers to scan available frequency bands and report signal quality values of the available frequency bands to the processor.

35. The multiband RF communication device of claim 24, wherein the processor operates to determine a best available frequency band based on the received signal quality values of the available frequency bands and command the plurality of multi-band RF transceivers to seamlessly handover an ongoing communication service from an active frequency band to the best available band without interruption.

36. The multiband RF communication device of claim 24, wherein the signal quality values include a signal-to-noise ratio (SNR) and a received signal strength indication (RSSI).

37. The multiband RF communication device of claim 24, wherein the integrated RF multi-band bandpass apparatus and the plurality of multi-band RF transceivers operate to simultaneously transmit and receive at two or more frequency bands in a multiband multiple-input-multiple-output (MIMO) radio communication.

38. The multiband RF communication device of claim 24, wherein the two or more frequency bands include: CDMA bands, GSM bands, WCDMA bands, TD-SCDMA bands, FDD LTE bands, TDD LTE bands, GPS bands, and WiFi bands.

39. The multiband RF communication device of claim 24, wherein the integrated RF multi-band bandpass apparatus and the plurality of multi-band RF transceivers operate to simultaneously transmit and receive at two or more frequency bands in an inter-band uplink and downlink carrier aggregation operation.

40. The multiband RF communication device of claim 24, wherein the multi-band RF communication device includes a compact smartphone, a mobile phone, a portable tablet computer, a portable laptop computer, a GPS devices, or a WiFi device.

41. A method of processing a multiband radio frequency (RF) signal in a multiband RF communication device, comprising:
   receiving multi-band RF signals at a multi-band antenna;
   coupling the multi-band RF signals to an RF input transmission line;
   simultaneously coupling the multi-band RF signals from the RF input transmission line to each of a plurality of dielectric ring resonators of different sizes and different resonant frequencies;
   filtering, at the plurality of dielectric ring resonators, the multi-band RF signals into multiple single-band bandpass signals;
   simultaneously outputting the multiple single-band bandpass signals to a plurality of RF output transmission lines by electromagnetically coupling each of the multiple single-band bandpass signals to a corresponding transmission line in the plurality of RF output transmission lines; and
   coupling the multiple single-band bandpass signals to a plurality of downstream multi-band RF circuits.

42. The method of claim 41, wherein the RF input transmission line includes a plurality of input coupling pads and each of the plurality of dielectric ring resonators includes an input feeding probe embedded within the dielectric ring resonator, wherein coupling the multi-band RF signals from the RF input transmission line to each of a plurality of dielectric ring resonators includes electromagnetically coupling a portion of the multi-band RF signals onto the input feeding probe corresponding to the dielectric ring resonator through the plurality of input coupling pads.

43. The method of claim 42, wherein electromagnetically coupling a portion of the multi-band RF signals onto the input feeding probe corresponding to the dielectric ring resonator through the plurality of input coupling pads includes using a single coupling pad in direct contact with the RF input transmission line and each input feeding probe of the plurality of dielectric ring resonators to couple the multi-band RF signals.

44. The method of claim 42, wherein electromagnetically coupling a portion of the multi-band RF signals onto the input feeding probe corresponding to the dielectric ring resonator through the plurality of input coupling pads includes electromagnetically coupling between a corresponding input coupling pad within the plurality of input coupling pads which is in direct contact with the RF input transmission line and the corresponding input feeding probe.

45. The method of claim 42, wherein each of the plurality of RF output transmission lines includes an output coupling pad and each of the plurality of dielectric ring resonators includes an output feeding probe embedded within the dielectric ring resonator, and wherein electromagnetically coupling each of the multiple single-band bandpass signals to a corresponding transmission line in the plurality of RF output transmission lines includes electromagnetically coupling a corresponding single-band bandpass signal between a corresponding output feeding probe and a corresponding output coupling pad.

46. The method of claim 41, wherein the set of downstream RF circuits includes one or more TDD front-end modules and radio transceivers, one or more FDD front-end modules and radio transceivers, and WiFi modules.

47. The method of claim 41, wherein the received multi-band RF signals include a combination of the following RF bands: CDMA bands, GSM bands, WCDMA bands, TD-SCDMA bands, FDD LTE bands, TDD LTE bands, GPS bands, and WiFi bands.

48. A method of processing a multiband RF signal in a multiband RF communication device, comprising:
   receiving multiple desired RF signals from a set of RF circuits at a plurality of input RF transmission lines;
   coupling the multiple desired RF signals from the plurality of input RF transmission lines into a set of dielectric ring resonators of different sizes and different resonant frequencies, wherein each of the input RF transmission lines is coupled to a respective dielectric ring resonator within the set of dielectric ring resonators;
   filtering, at the set of dielectric ring resonators, the multiple desired RF signals into multiple desired bandpass signals based on the resonant frequencies of the set of dielectric ring resonators;
   simultaneously coupling the multiple desired bandpass signals into an output RF transmission line to multiplex the multiple bandpass signals into a multi-band RF signal; and
   coupling the multiplexed multi-band RF signal from the output RF transmission line onto a multiband antenna for transmission.

49. The method of claim 48, wherein the set of RF circuits includes one or more TDD front-end modules and radio transceivers, one or more FDD front-end modules and radio transceivers, and WiFi modules.

50. The method of claim 48, wherein the set of dielectric ring resonators are coplanar, and concentrically positioned with substantially the same axis.

51. A method of processing a multiband RF signal, comprising:
- transmitting and receiving the multiband RF signal in a multiband transmission line, wherein the multiband transmission line is electromagnetically coupled to a shared coupling slot etched in a ground conductive plane;
- electromagnetically coupling the multiband RF signal into a plurality of dielectric ring resonators of different sizes and different resonant frequencies through the shared coupling slot, wherein the plurality of dielectric ring resonators are in direct contact with the ground conductive plane;
- filtering, at the plurality of dielectric ring resonators to generate a plurality of single-band RF signals;
- transmitting and receiving the plurality of single-band RF signals in a plurality of single-band transmission lines, wherein each of the single-band transmission lines is electromagnetically coupled to a respective coupling slot etched in the ground conductive plane; and
- electromagnetically coupling the plurality of single-band RF signals from each of the dielectric ring resonators into the plurality of single-band transmission lines through a respective coupling slot.

52. The method of claim 51, wherein the plurality of dielectric ring resonators are coplanar, and concentrically positioned with substantially the same axis.

* * * * *